United States Patent
Henning et al.

(10) Patent No.: US 12,416,245 B2
(45) Date of Patent: Sep. 16, 2025

(54) DUAL PURPOSE ENERGY PLANT

(71) Applicant: NUOVO PIGNONE TECNOLOGIE S.r.l., Florence (IT)

(72) Inventors: Carlos Henning, Buenos Aires (AR); David Madden, Limerick (IE)

(73) Assignee: NUOVO PIGNONE TECNOLOGIE S.R.L., Florence (IT)

( * ) Notice: Subject to any disclaimer, the term of this patent is extended or adjusted under 35 U.S.C. 154(b) by 0 days.

(21) Appl. No.: 18/503,248

(22) Filed: Nov. 7, 2023

(65) Prior Publication Data

US 2025/0146423 A1 May 8, 2025

(51) Int. Cl.
*F01D 15/10* (2006.01)
*F01N 3/08* (2006.01)
*F01N 5/02* (2006.01)

(52) U.S. Cl.
CPC ........... *F01D 15/10* (2013.01); *F01N 3/0857* (2013.01); *F01N 3/0871* (2013.01); *F01N 5/02* (2013.01); *F01N 2270/10* (2013.01); *F01N 2310/00* (2013.01); *F05D 2220/31* (2013.01); *F05D 2260/61* (2013.01)

(58) Field of Classification Search
CPC ...... F01D 15/10; F01N 3/0857; F01N 3/0871; F01N 5/02; F01N 2270/10; F01N 2310/00; F05D 2220/31; F05D 2260/61
See application file for complete search history.

(56) References Cited

U.S. PATENT DOCUMENTS

| | | | | |
|---|---|---|---|---|
| 9,222,480 B2* | 12/2015 | Younes | .................... | F01N 5/02 |
| 9,249,690 B2* | 2/2016 | Karni | ........................ | F02C 3/34 |
| 10,018,115 B2* | 7/2018 | Allam | .................. | F25J 3/04018 |

(Continued)

FOREIGN PATENT DOCUMENTS

| CN | 114282828 A | 4/2022 |
|---|---|---|
| CN | 114673571 A | 6/2022 |

(Continued)

OTHER PUBLICATIONS

Fahr et al., "Assessing the physical potential capacity of direct air capture with integrated supply of low-carbon energy sources"; Georgia Institute of Technology; Dec. 8, 2021; 26 pages.

(Continued)

*Primary Examiner* — Jesse S Bogue
(74) *Attorney, Agent, or Firm* — CANTOR COLBURN LLP

(57) ABSTRACT

A system for generating electricity with reduced or negative carbon emissions. The system includes a power plant section having an electricity generating unit having an input coupled to a hydrocarbon fuel supply and an energy exchange path. The system also includes a direct air capture (DAC) section having a $CO_2$ adsorption device having a $CO_2$ adsorbent material and a ventilator electrically coupled to the electricity generating unit, the ventilator directing air flow through the $CO_2$ adsorption device in a carbon capture mode, wherein the $CO_2$ adsorption device is coupled to and in energy communication with the energy exchange path for releasing adsorbed $CO_2$ in a carbon release mode.

9 Claims, 15 Drawing Sheets

(56) References Cited

U.S. PATENT DOCUMENTS

| | | | |
|---|---|---|---|
| 11,168,888 B2* | 11/2021 | Boyce | F01D 15/10 |
| 11,685,658 B2* | 6/2023 | GilroySmith | F01K 13/00 |
| | | | 62/617 |
| 11,852,376 B2* | 12/2023 | Van der Walt | F24F 1/0059 |
| 12,064,725 B1* | 8/2024 | Jang | B01D 53/185 |
| 2002/0023423 A1* | 2/2002 | Viteri | F02C 6/18 |
| | | | 60/39.182 |
| 2013/0145773 A1* | 6/2013 | Kulkarni | F02C 3/34 |
| | | | 60/39.5 |
| 2018/0340454 A1* | 11/2018 | Smogorzewski | F02C 1/08 |
| 2021/0300765 A1 | 9/2021 | Gilroysmith et al. | |
| 2021/0381391 A1* | 12/2021 | Ono | F02C 6/10 |
| 2021/0396176 A1* | 12/2021 | Iwai | F01K 25/103 |
| 2022/0040668 A1 | 2/2022 | Weston | |
| 2022/0401873 A1* | 12/2022 | Eddaoudi | B01D 53/0462 |
| 2023/0173428 A1* | 6/2023 | Sikka | F03D 9/22 |
| | | | 95/113 |
| 2023/0347276 A1* | 11/2023 | Hillel | B01D 53/0462 |
| 2024/0058742 A1* | 2/2024 | Dunn | B01D 53/261 |
| 2024/0075452 A1* | 3/2024 | Lanigan-Atkins | B01J 20/3483 |
| 2024/0200492 A1* | 6/2024 | Ferner | F02C 3/34 |

FOREIGN PATENT DOCUMENTS

| | | |
|---|---|---|
| CN | 217410255 U | 9/2022 |
| WO | 2022235664 A2 | 11/2022 |

OTHER PUBLICATIONS

Sadiq et al., "A Pilot-Scale Demonstration of Mobile Direct Air Capture Using Metal-Organic Frameworks"; Adv. Sustainable Syst. 2020, 4; 8 pages.

International Search Report and Written Opinion; PCT/IB2024/060993; European Patent Office; Mailed Mar. 6, 2025; 10 pages.

* cited by examiner

DUAL PURPOSE ENERGY PLANT

BACKGROUND

This disclosure relates generally to a dual-purpose energy plant and more particularly to an energy plant that generates electricity with reduced or even negative carbon emissions as a whole.

Electricity for an electric grid generally has several power plants that combust fossil fuel to produce energy for powering an electric generator connected to the electric grid. As is generally known, the combustion process emits carbon as a byproduct of the combustion. Unfortunately, the emitted carbon can contribute to atmospheric "greenhouse" gasses that can be a contributor to so called climate change. Climate change can be potentially dangerous as causing natural disasters or economic problems, which can result from a rise in sea level or agricultural problems for example. Hence, the power industry would welcome improvements in technology to generate electricity with reduced carbon emissions compared to conventional power plants or even negative carbon emissions where the electricity generation process as a whole removes more carbon from the atmosphere than any that may be added by combustion.

BRIEF SUMMARY

Disclosed is a system for generating electricity with reduced or negative carbon emissions. The system includes: a power plant section having an electricity generating unit having an input coupled to a hydrocarbon fuel supply and an energy exchange path; and a direct air capture (DAC) section having a $CO_2$ adsorption device having a $CO_2$ adsorbent material and a ventilator electrically coupled to the electricity generating unit, the ventilator directing air flow through the $CO_2$ adsorption device in a carbon capture mode; wherein the $CO_2$ adsorption device is coupled to and in energy communication with the energy exchange path for releasing adsorbed $CO_2$ in a carbon release mode.

Also disclosed is a method for generating electricity with reduced or negative carbon emissions. The method includes: generating the electricity in a power plant section of an electric power plant system using an electricity generating unit being coupled to a hydrocarbon fuel supply and having an electrical output and an energy exchange path; gathering by adsorption carbon dioxide ($CO_2$) from air in a Direct Air Capture (DAC) section of the electric power plant system using a $CO_2$ adsorption device having a $CO_2$ adsorbent material in a carbon capture mode; flowing the air through the $CO_2$ adsorption device using a ventilator receiving electric power from the electricity generating unit in the carbon capture mode; and releasing $CO_2$ from the $CO_2$ adsorption device by providing energy to the $CO_2$ adsorbent material with energy from the energy exchange path in a carbon release mode.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures, in which like elements are numbered alike.

Figures are presented below that illustrate various embodiments for generating electricity with reduced or negative carbon emissions. These figures include arrows for illustrating direction of fluid flow from a first component to a second component that is coupled to the first component. These arrows represent conduits, pipes, tubing, ducts or other types of flow paths for containing and directing the fluid flow. These arrows may also represent valves or dampers in the flow paths for controlling fluid flow in the flow paths in accordance with a mode of operation. These valves may be remotely controlled by a controller that may provide for automatic or manual operation. These arrows may also represent any pumps required for motivating fluid flow in accordance with a design configuration of the disclosed components. Arrows identifying electrical communication represent electrical conductors, transformers, switchgear, or other components needed for electrically powering a device. Locations where arrows leave or enter a component can represent output ports or input ports, respectively, for fluid flow or connections for electrical components. As can be seen in the figures, the arrows also indicate how a component is coupled, either directly or indirectly (with an intermediate component), to another component.

Disclosed herein are embodiments of an electric power plant system that generates electric power with reduced or negative carbon emissions. Hence, the electric power plant system has a dual purpose-generating electric power and reducing carbon emissions into the ambient air or even taking carbon out of the ambient air in total.

Figure 1:
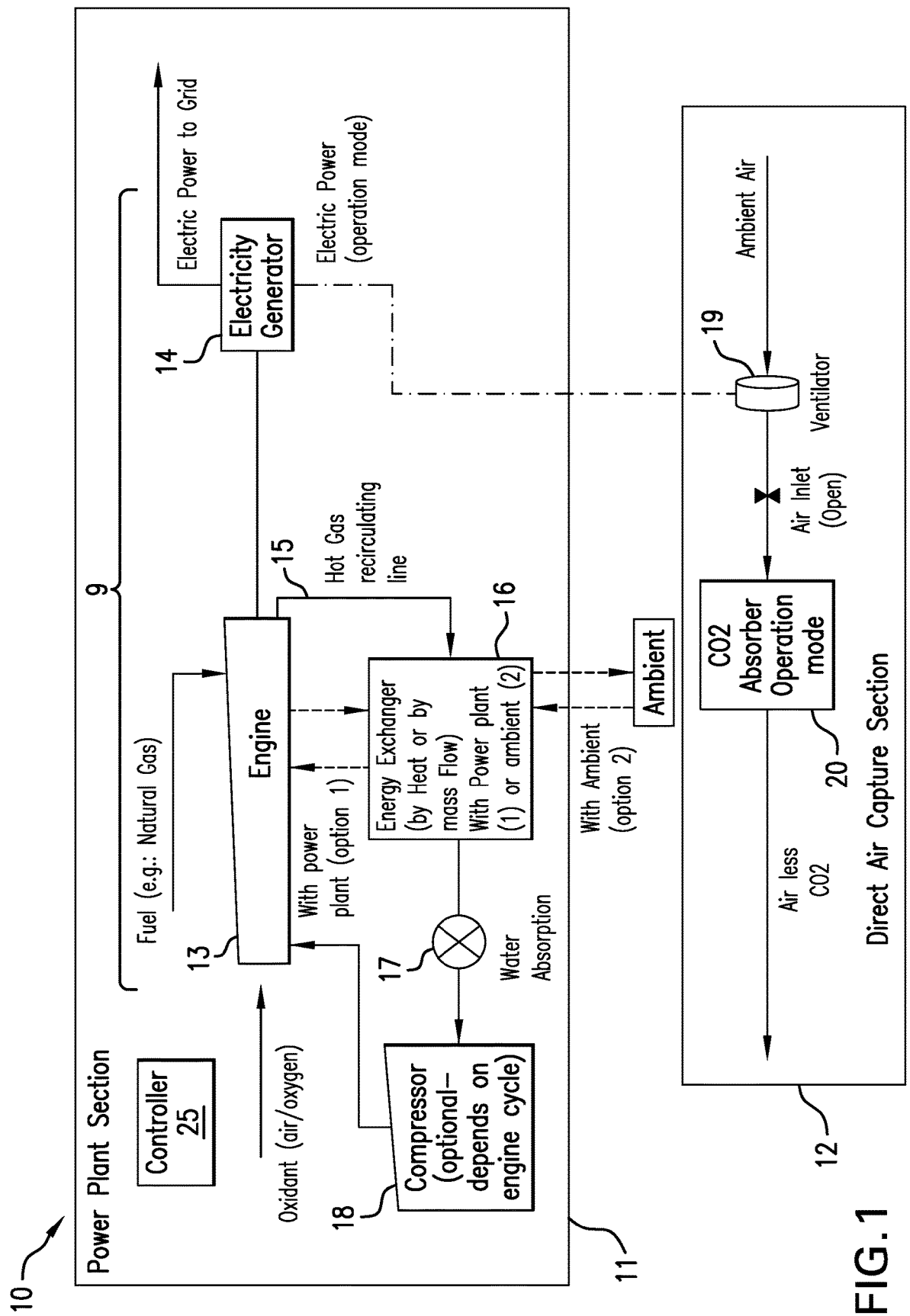
FIG. 1 depicts aspects of a power plant section coupled to a direct air capture (DAC) section in a carbon capture mode.

FIG. 1 illustrates a simplified diagram of an electric power plant system 10 having a power plant section 11 coupled to a direct air capture (DAC) section 12 operating in a carbon capture mode. The power plant section 12 includes an electricity generating unit 9 for converting a fossil fuel or hydrocarbon fuel into electricity or electrical power. Non-limiting embodiments of the electricity generating unit 9 include a supercritical carbon dioxide power cycle, a gas turbine, a reciprocating engine (e.g., a gasoline or diesel engine), or a fuel cell system that produces a carbon dioxide stream and an energy discharge stream (e.g., a solid oxide fuel cell system). Each embodiment of the electricity generating unit 9 includes an energy exchange path (e.g., a heat discharge path) that may also be referred to as an engine exhaust in some embodiments. In one or more embodiments, the electricity generating unit 9 includes a prime mover or engine 13 that combusts the hydrocarbon fuel to provide mechanical energy to drive an electric generator 14 mechanically connected (such as by the illustrated shaft) or hydraulically connected to the engine 13. The electric generator 14 generates electricity and a first portion of the generated electricity is provided to an electric grid by a grid connection. In embodiments using the fuel cell system, an inverter (not shown) connected to electrodes of the fuel cell system may be used to supply a first portion of alternating current (AC) electricity from the fuel cell system to the grid. A second portion of the generated electricity is provided to the DAC section 12 for operation of DAC section components. A hot gas recirculation line 15 receives hot gas from the engine 13 and provides the hot gas to an energy exchanger 16. The energy exchanger 16 provides heat energy from the hot gas to the engine 13 in a first option or provides heat energy to an ambient environment in a second option. The cooler gas from the energy exchanger 16 passes through a first water absorber or water separator 17 to remove water from the gas. Optionally, a first compressor 18 compresses the drier gas from the water separator 17 and provides the compressed gas back to the engine 13.

The DAC section 12 includes a ventilator 19 that provides or directs ambient air to a carbon dioxide ($CO_2$) adsorption device 20. The $CO_2$ adsorption device 20 removes $CO_2$ and thus the associated carbon from the ambient air. Air having less $CO_2$ is then discharged from the $CO_2$ adsorption device 20. The ventilator 19 is electrically coupled to and receives electric power from the electricity generating unit 9. Hereinafter, any discussion of the electricity being supplied by the electric generator 14 inherently includes electricity being supplied by the fuel cell system when used as the electricity generating unit 9.

A controller 25 may be disposed in the power plant section 11 and/or the DAC section 12 for controlling operations of the electric power plant system 10 related to operating apparatus disclosed herein to enable electric power production with reduced or negative carbon emissions in accordance with the different modes of operation discussed herein. For example, the controller 25 may be configured to control valves or dampers for controlling a flow of fluid such as a working fluid, a heat transfer fluid, $CO_2$ for sequestration or export or for recycling, or air. Also, the controller 25 may be configured to control electrical switchgear for controlling power to the ventilator 19 and/or $CO_2$ compressors. The controller 25 may be configured to accept manual inputs and/or to provide automatic control. Automatic control may be implemented by an analog or digital processor implementing an algorithm. The algorithm may include model-based learning, machine learning, and/or artificial intelligence. In one or more embodiments, the algorithm may implement a neural network. The controller 25 may also include traditional control systems such as proportional, integral, and/or derivative (PID) control. Additionally, the controller 25 may receive inputs from sensors such as temperature, pressure, and/or flow sensors distributed throughout the electric power plant system 10. Further, the controller 25 may be configured to communicate with other processing devices whether locally such as by wireless communication or remotely such as by over the internet. Accordingly, the controller 25 can be used to optimize the reduction of carbon emissions.

Figure 2:
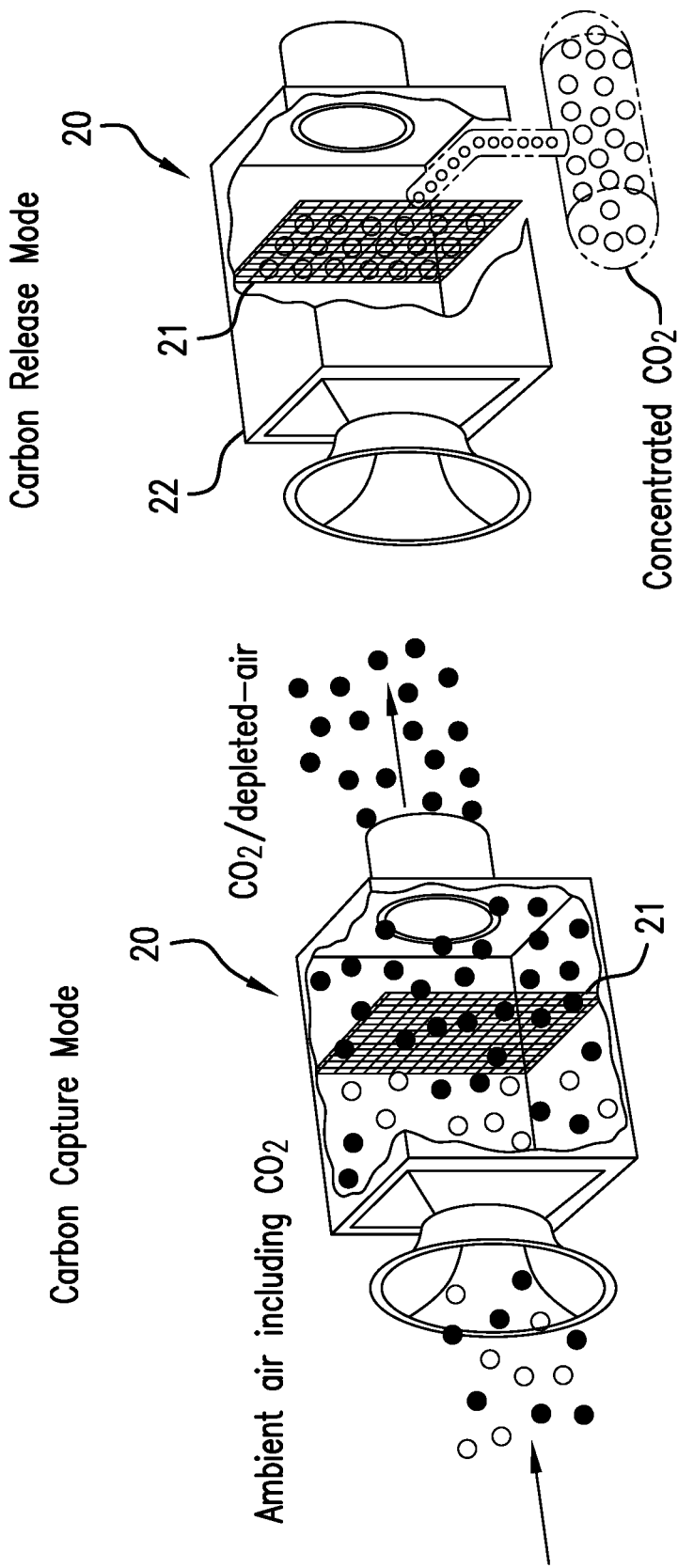
FIG. 2 depicts aspect of a carbon dioxide adsorption device in the DAC section.

FIG. 2 depicts aspects of the $CO_2$ adsorption device 20. In the embodiment of FIG. 2, the $CO_2$ adsorption device 20 includes a housing 22 that supports a $CO_2$ adsorbent material 21 and directs air flow from the ventilator 19 to the adsorbent material 21. Heating the $CO_2$ adsorbent material 21 in a carbon release mode causes the $CO_2$ adsorbent material 21 to release $CO_2$ for further processing and sequestration. In a non-limiting embodiment, the $CO_2$ adsorbent material 21 is a metal-organic-framework (MOF) as known in the art.

Figure 3:
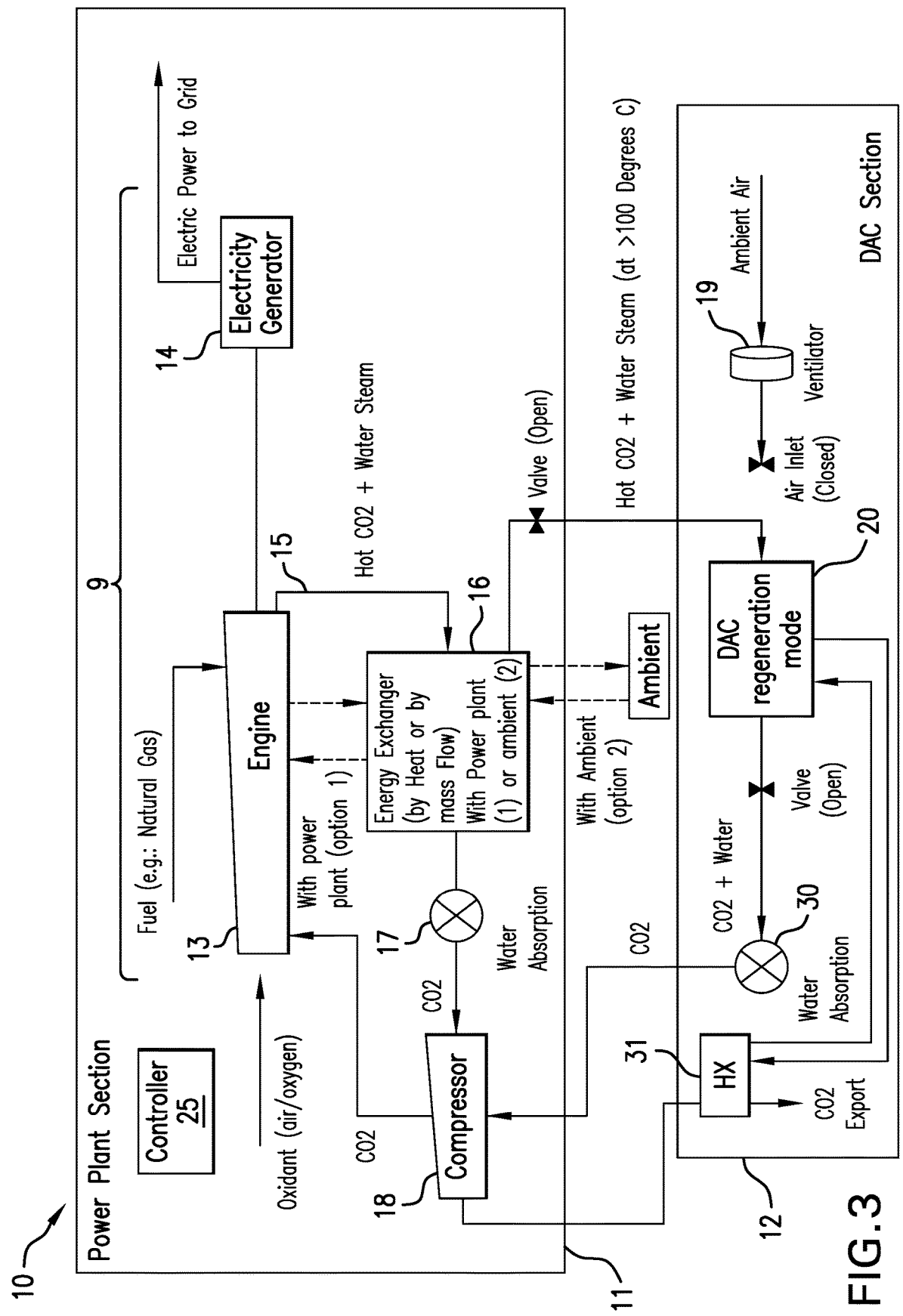
FIG. 3 depicts aspects of the power plant section coupled to the DAC section in a carbon release mode.

FIG. 3 illustrates a simplified diagram of the electric power plant system 10 having the power plant section 11 coupled to the DAC section 12 operating in a carbon release mode. In the carbon release mode, heat from the energy exchanger 16 is used to heat the $CO_2$ adsorbent material 21 to release the adsorbed $CO_2$. The heat can be provided indirectly with the energy exchanger 16 being a heat exchanger or directly by mass flow of the hot exhaust or emission emitted by the electricity generating unit 9 being directed directly to the $CO_2$ adsorption device 20. With the energy exchanger 16 being a heat exchanger, heat from a hot exhaust fluid on the primary side heats a heat transfer fluid on the secondary side, which is then used to heat the $CO_2$ adsorbent material 21. With the energy exchanger 16 providing heat directly to the $CO_2$ adsorbent material 21, the energy exchanger 16 includes components such as piping and valves to directly flow the hot exhaust fluid to the $CO_2$ adsorption device 20 in a mode referred to as "mass flow."

$CO_2$ and water discharged from the $CO_2$ adsorption device 20 goes to a second water absorber or water separator 30 where water is separated from the entering $CO_2$ and water. Dry $CO_2$ from the second water separator 30 goes to the first compressor 18. A first portion of compressed $CO_2$ from the first compressor 18 is recycled back to the engine 13 while a second portion of the compressed $CO_2$ is exported for sequestration. Optionally, a carbon export heat exchanger (HX) 31 may be coupled to an output of the first compressor 18 (e.g., disposed in a pipeline conveying the second portion of the compressed $CO_2$ for export) to extract energy from the second portion of the compressed $CO_2$ for heating the $CO_2$ adsorbent material 21 in the carbon release mode. The second portion of the compressed $CO_2$ flows through a primary side of the carbon export heat exchanger 31 to heat a heat transfer fluid in the secondary side of the carbon export heat exchanger 31. This heat transfer fluid conveys energy to the $CO_2$ adsorbent material 21 in the carbon release mode to aid in releasing the adsorbed $CO_2$.

Figure 4:
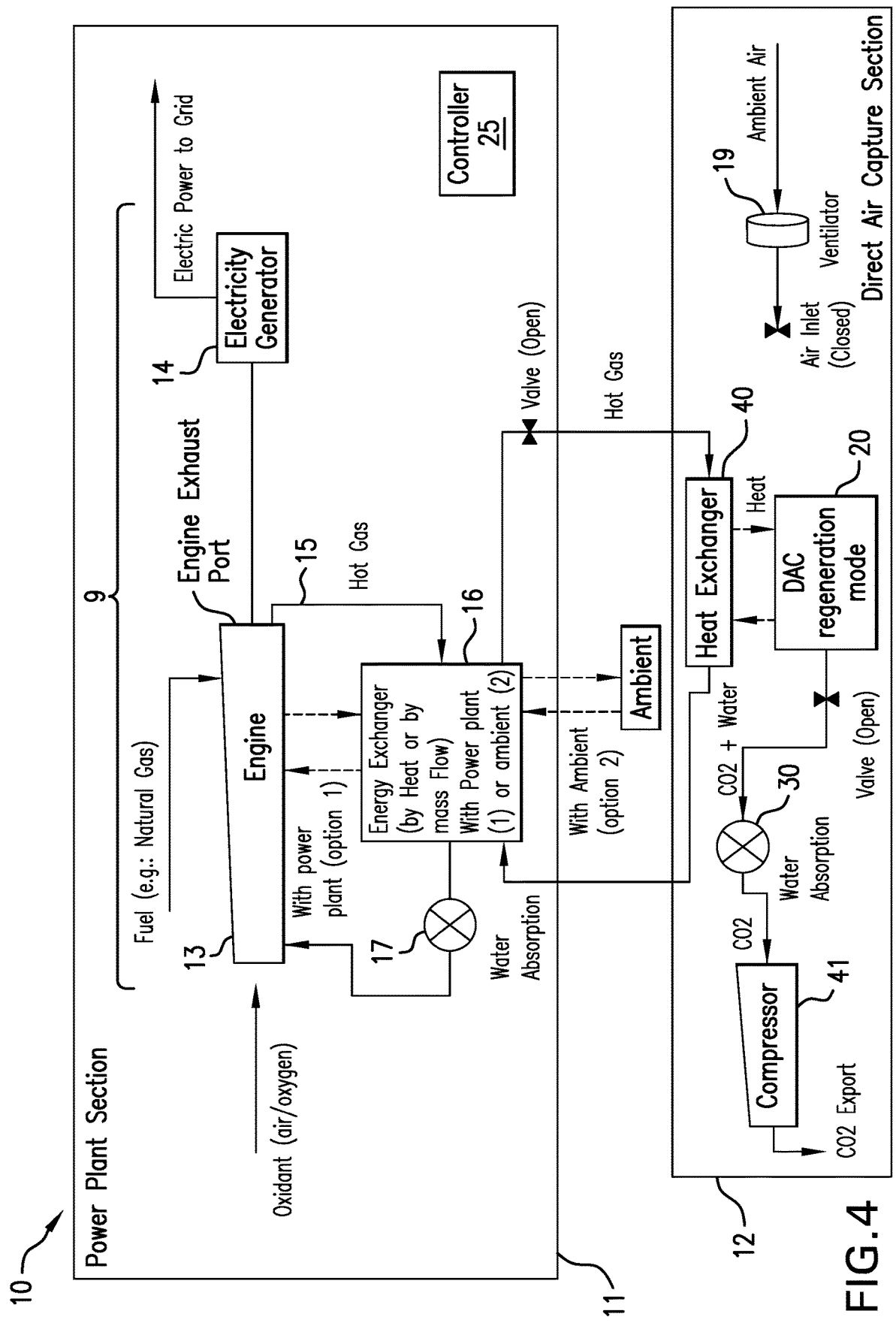
FIG. 4 depicts aspects of the power plant section coupled to the DAC section in the carbon release mode with the power plant section having an energy exchanger.

FIG. 4 illustrates a simplified diagram of the electric power plant system 10 having the power plant section 11 coupled to the DAC section 12 operating in a carbon release mode (also referred to as regeneration). Here, heat is provided to the $CO_2$ adsorber 20 to release adsorbed $CO_2$ by a heat exchanger 40 disposed in the DAC section 12. A primary side of the heat exchanger 40 is coupled to and receives heat energy from the energy exchanger 16. A secondary side of the heat exchanger 40 is coupled to and provides heat to the $CO_2$ adsorption device 20. $CO_2$ from the second water absorber or water separator 30 is compressed for export and sequestration by a second compressor 41 disposed in the DAC section 12. The second compressor 41 is electrically coupled to and powered by the electric generator 14.

Figure 5:
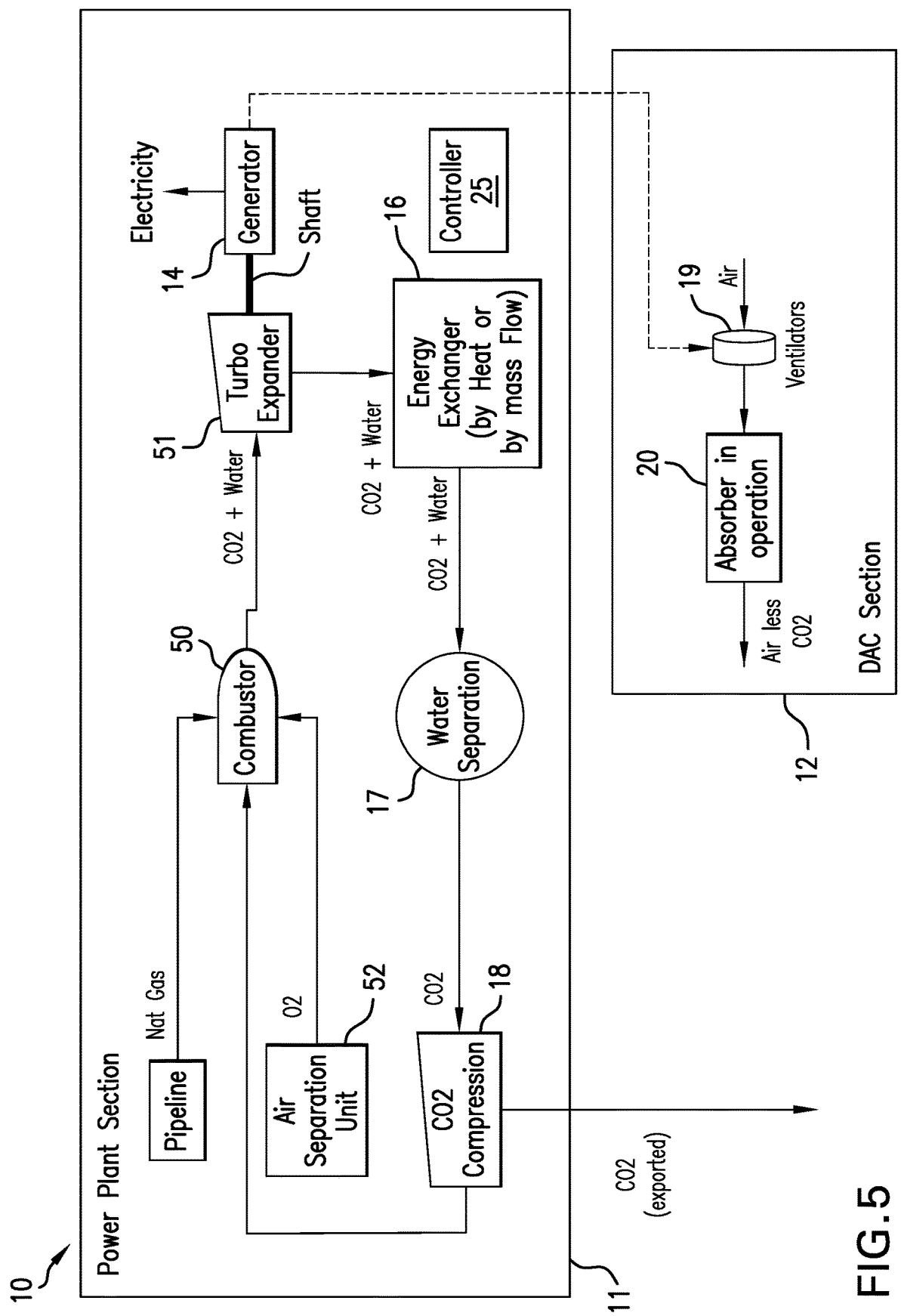
FIG. 5 depicts aspects of the power plant section having a supercritical $CO_2$ power cycle coupled to the DAC section in the carbon capture mode.

FIG. 5 illustrates a simplified diagram of the electric power plant system 10 having the power plant section 11 coupled to the DAC section 12 operating in a carbon capture mode with the engine 13 being a supercritical $CO_2$ power cycle. In the embodiment of FIG. 5, the supercritical $CO_2$ power cycle includes a combustor 50 configured to combust a hydrocarbon fuel to produce $CO_2$ and water in a supercritical state. In one or more embodiments, the combustor 50 includes a combustion chamber (not shown) where fuel and oxidant are combined and the combustion takes place. The supercritical $CO_2$ and water are provided to a turbo-expander 51. A discharge of the turbo-expander 51 is coupled to the energy exchanger 16, which provides a heat sink causing the supercritical $CO_2$ and water to expand in the turbo-expander 51 to turn an output shaft that is either directly or indirectly coupled to the electric generator 14. In general, the turbo-expander 51 includes a turbine having blades (not shown) upon which expanding fluid impinges to turn the turbine and a turbine shaft coupled to the electric generator 14. An air separation unit (ASU) 52 is disposed in the power plant section 11 with an output coupled to the combustor 50. The ASU 52 is configured to separate oxygen ($O_2$) from ambient air to provide the separated oxygen to the combustor 50 to aid in the combustion process.

Figure 6:
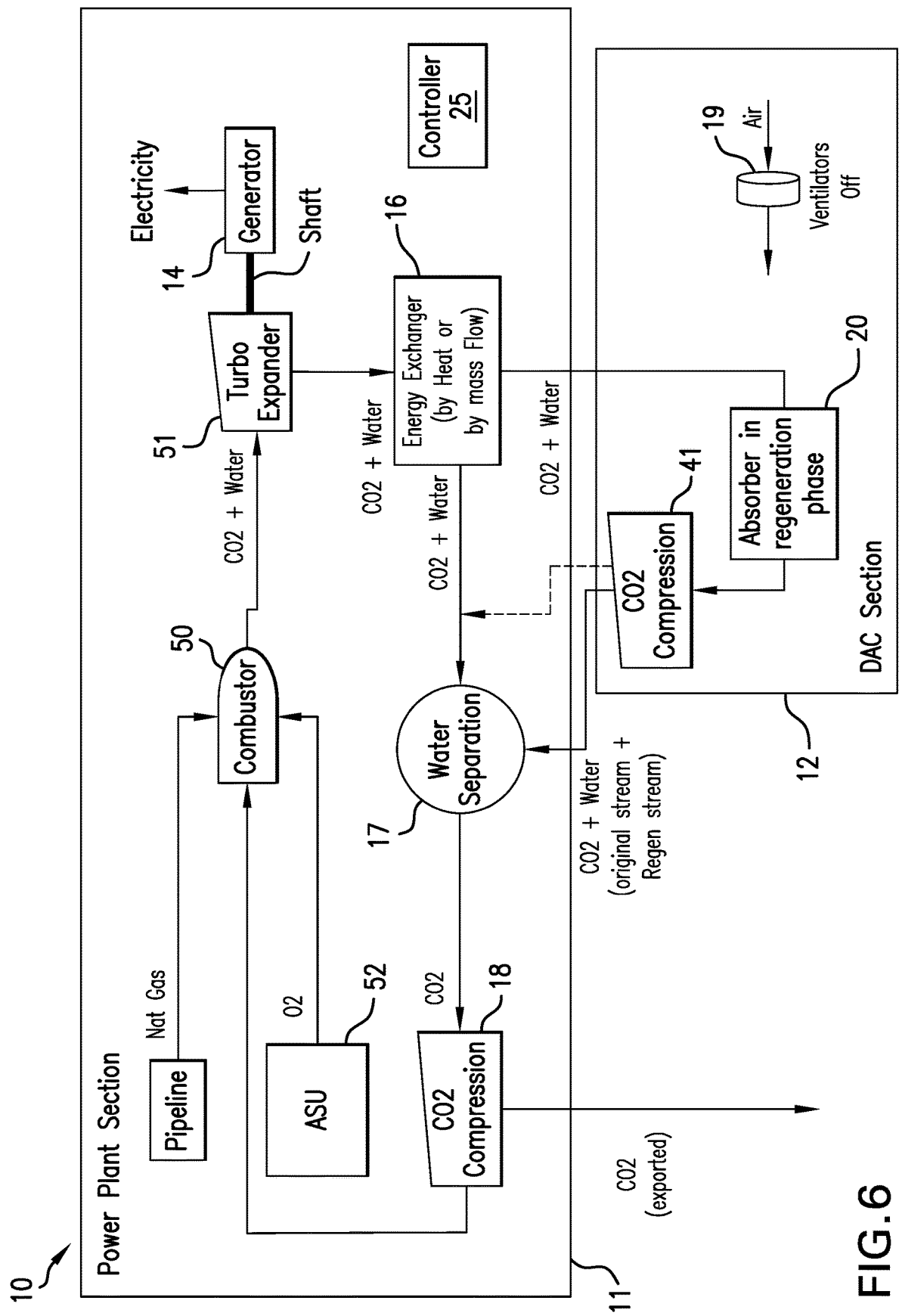
FIG. 6 depicts aspects of the power plant section having the supercritical $CO_2$ power cycle coupled to the DAC section in the carbon release mode.

FIG. 6 illustrates a simplified diagram of the electric power plant system 10 having the power plant section 11 coupled to the DAC section 12 operating in a carbon release mode with the engine 13 being the supercritical $CO_2$ power cycle. In the carbon release mode, heat is provided to the $CO_2$ adsorption device 20 by a heat transfer fluid in a line or pipe to the energy exchanger 16. The heat can be provided directly by mass flow or indirectly by the energy exchanger 16 being a heat exchanger where the secondary side provides the heat. In the embodiment of FIG. 6, the second compressor 41 provides compressed $CO_2$ to either an output line of the energy exchanger 16 or a separate input to the water separator 17.

Figure 7:
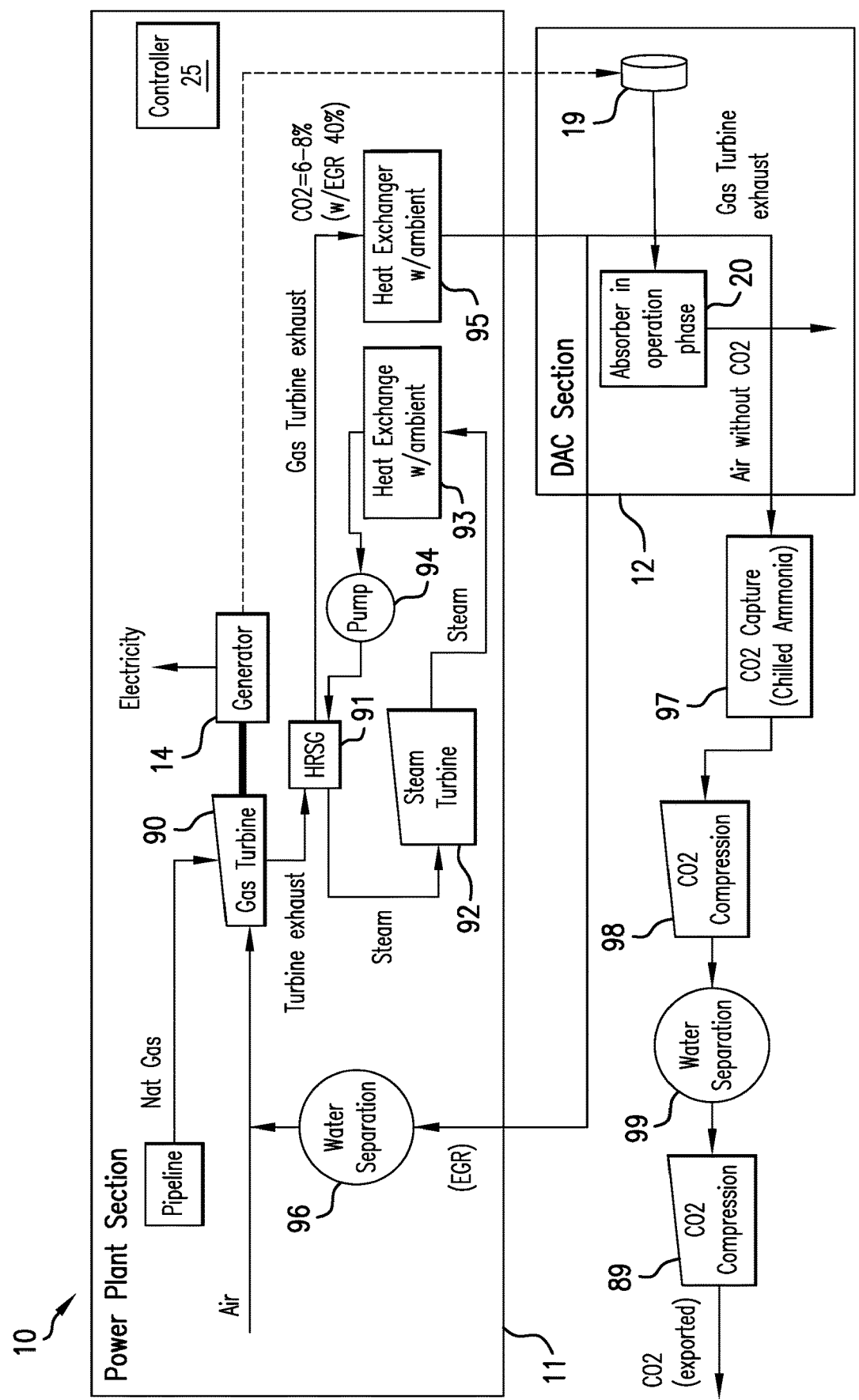
FIG. 7 depicts aspects of the power plant section having the gas turbine and the heat recovery components coupled to the DAC section in the carbon capture mode.
Figure 9:
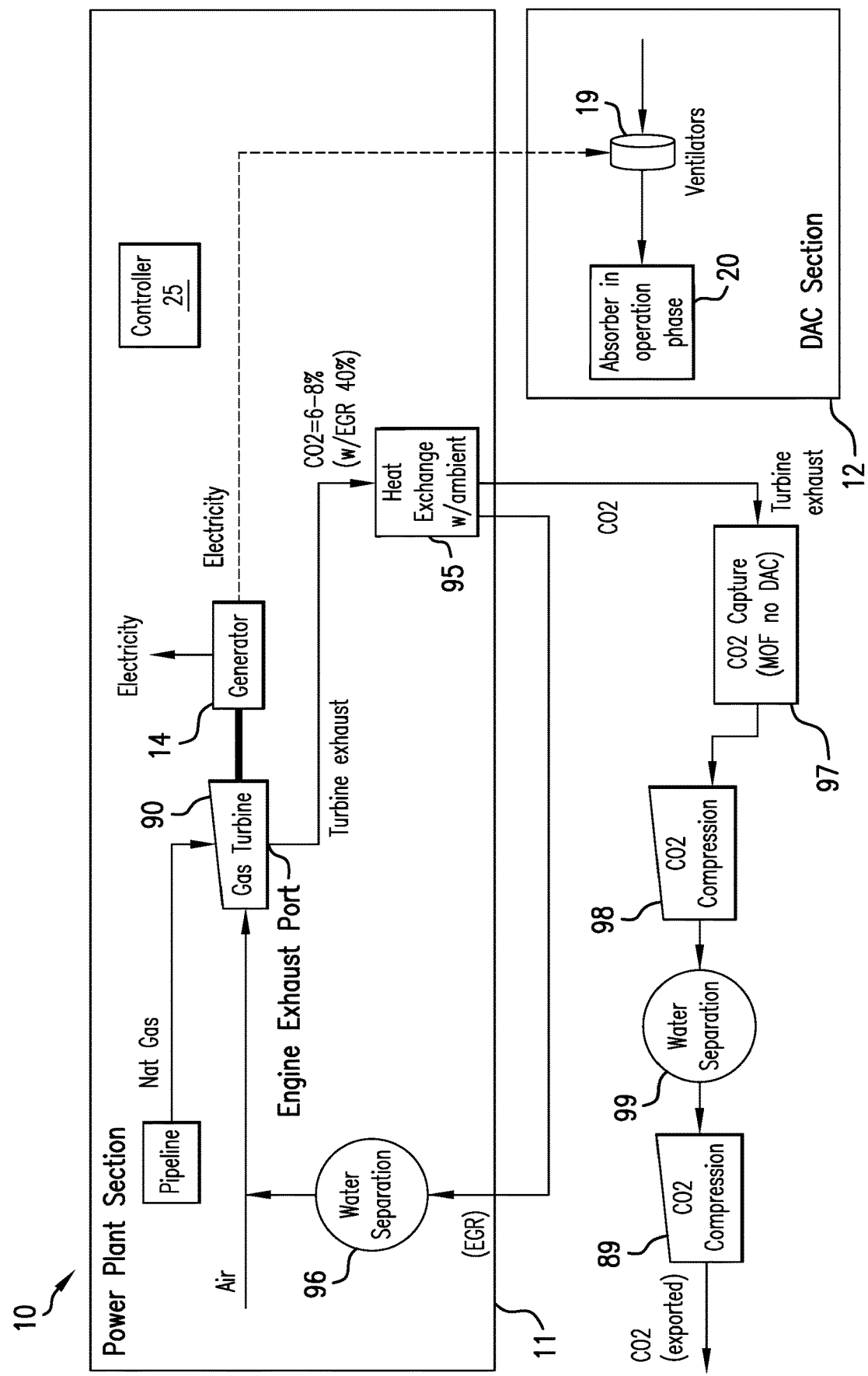
FIG. 9 depicts aspects of the power plant section having the gas turbine without the heat recovery components coupled to the DAC section in the carbon capture mode.

FIG. 7 illustrates a more detailed embodiment of the electric power plant system 10 having the power plant section 11 coupled to the DAC section 12 operating in the carbon capture mode with the engine 13 being a gas turbine 90 (may also be a reciprocating engine or a fuel cell inherent with electricity generating electrodes or any engine having a heat and $CO_2$ exhaust stream). Components not shown in either the power plant section 11 or the DAC section 12 may be considered to be disposed adjacent to the power plant section 11 or alternatively in the power plant section 11. In the embodiment of FIG. 9, a heat recovery power cycle (HRPC) is disposed in an exhaust path of the gas turbine 90 between an exhaust heat exchanger 95 and the gas turbine 90. The HRPC uses waste energy from the gas turbine exhaust to generate more electricity, thus, increasing efficiency of the electric power generation. The heat recovery power cycle includes a heat recovery steam generator (HRSG) 91, a steam turbine 92, a HRPC heat exchanger 93, and a HRPC pump 94. The HRSG 91 generates steam using heat from the exhaust path of the gas turbine 90. The generated steam is received by the steam turbine 92 to convert the energy of the steam to mechanical energy to turn a shaft coupled to the electric generator 14 or alternatively to another electric generator also connected to the electric grid. The HRPC heat exchanger 93 provides a heat sink for the discharge of the steam turbine 92 by condensing the steam to provide the necessary pressure drop across the steam turbine 92. The HRPC pump 94 pumps the condensate from the HRPC heat exchanger 93 back to the HRSG 91 to complete the heat recovery power cycle.

Downstream of the HRPC, the exhaust heat exchanger 95 further cools the exhaust from the gas turbine 90. The exhaust is cooled by air or other cooling source in the secondary side of the exhaust heat exchanger 95. From the exhaust heat exchanger 95, a first portion of the exhaust flows to a $CO_2$ capture device 97, which captures $CO_2$ from the exhaust. In one or more embodiments, the $CO_2$ capture device 97 implements a Chilled Ammonia Process (CAP) or a Compact Carbon Capture with rotating bed (3C), all known in the art. The captured $CO_2$ is then compressed by a first captured $CO_2$ compressor 98 and dried by a captured $CO_2$ water separator 99. The dried captured $CO_2$ is then further compressed by a second captured $CO_2$ compressor 89 and provided for export and sequestration. A second portion of the exhaust discharged by the exhaust heat exchanger 95 is used for exhaust gas recirculation (EGR) and flows to a water separator 96 to separate water from the second portion of the exhaust to provide dry EGR exhaust. The dry EGR exhaust is then combined with air entering the gas turbine 90 for combustion.

Figure 8:
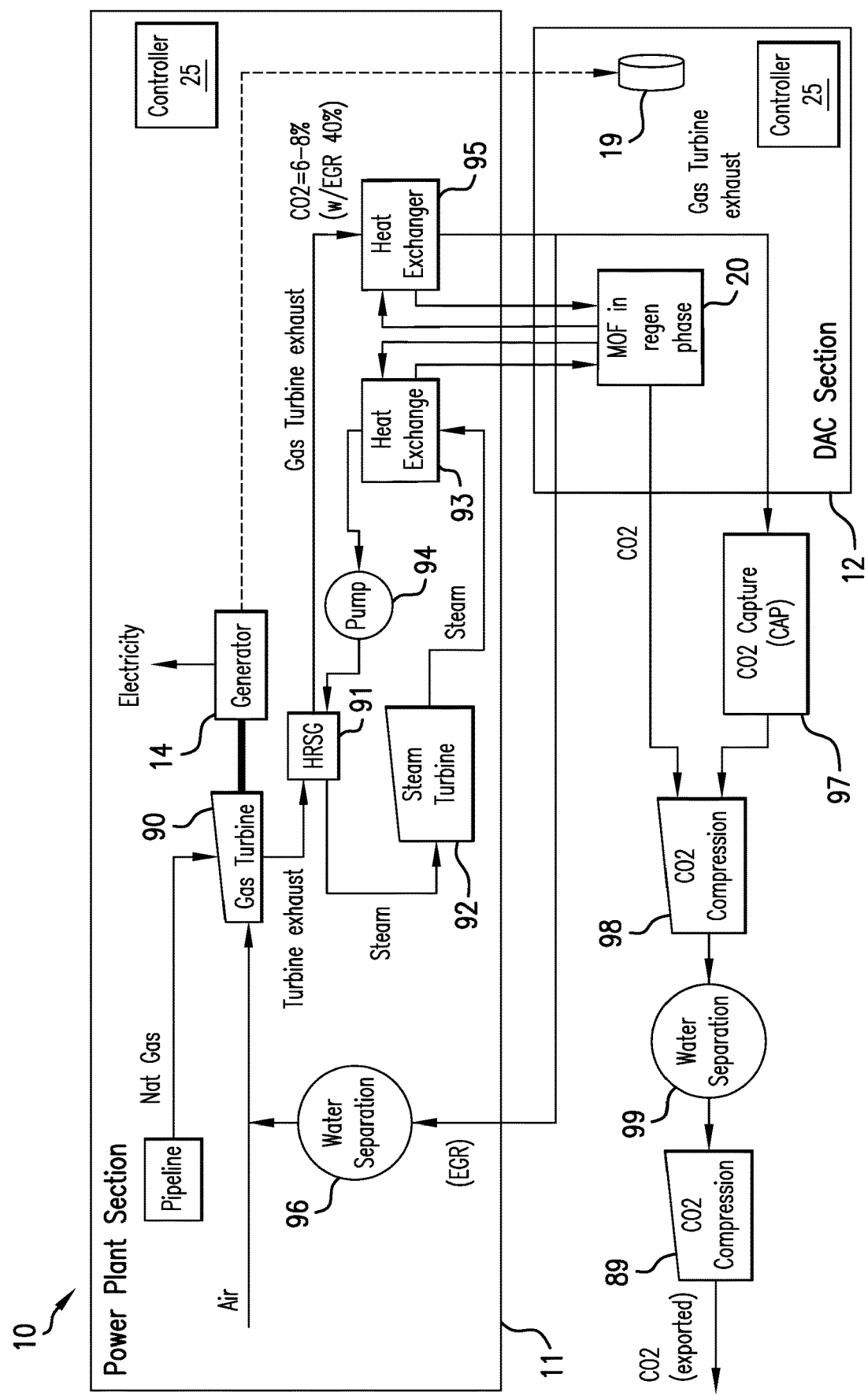
FIG. 8 depicts aspects of the power plant section having the gas turbine and the heat recovery components coupled to the DAC section in the carbon release mode.

FIG. 8 illustrates a more detailed embodiment of the electric power plant system 10 having the power plant section 11 coupled to the DAC section 12 operating in the carbon release mode with the engine 13 being the gas turbine 90. In the carbon release mode, both the exhaust heat exchanger 95 and the HRPC heat exchanger 93 supply heat to the $CO_2$ adsorption device 20 to release (also referred to as regeneration) $CO_2$ and supply the released $CO_2$ to the first captured $CO_2$ compressor 98. Hence, in the carbon release mode the first captured $CO_2$ compressor 98 compresses $CO_2$ provided by the $CO_2$ capture device 97 and the $CO_2$ adsorption device 20. In general, in the carbon release mode the controller 25 will turn off the ventilator 19 and open flow control devices to supply energy (e.g., heat) to the $CO_2$ adsorption device 20.

FIG. 9 illustrates another more detailed embodiment of the electric power plant system 10 having the power plant section 11 coupled to the DAC section 12 operating in the carbon capture mode with the engine 13 being the gas turbine 90. The embodiment of FIG. 9 is similar to the embodiment of FIG. 7, but without the heat recovery power cycle disposed downstream of gas turbine exhaust. Here, the gas turbine exhaust goes directly to the exhaust heat exchanger 95 where the exhaust is mainly cooled before going to the $CO_2$ capture device 97, the first captured $CO_2$ compressor 98, the captured $CO_2$ water separator 99, and the second captured $CO_2$ compressor 89 in that order.

Figure 10:
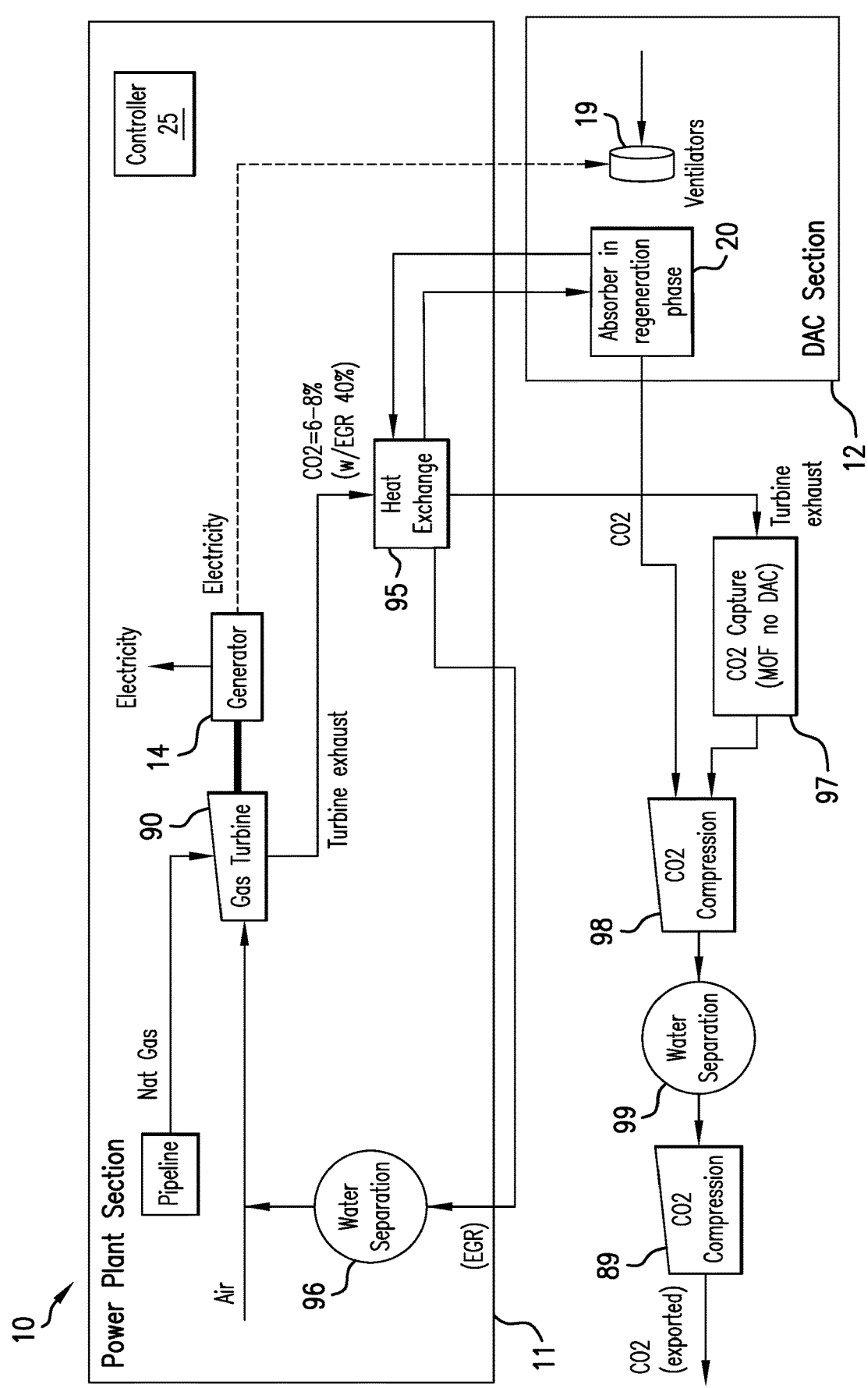
FIG. 10 depicts aspects of the power plant section having the gas turbine without the heat recovery components coupled to the DAC section in the carbon release mode.

FIG. 10 illustrates another more detailed embodiment of the electric power plant system 10 having the power plant section 11 coupled to the DAC section 12 operating in the carbon release mode with the engine 13 being the gas turbine 90. Here, in the carbon release mode heat for releasing $CO_2$ from the adsorption device 20 is provided only or mostly by a heat transfer fluid flowing through a secondary side of the exhaust heat exchanger 95. The heat transfer fluid is heated by heat energy in the gas turbine exhaust.

Figure 11:
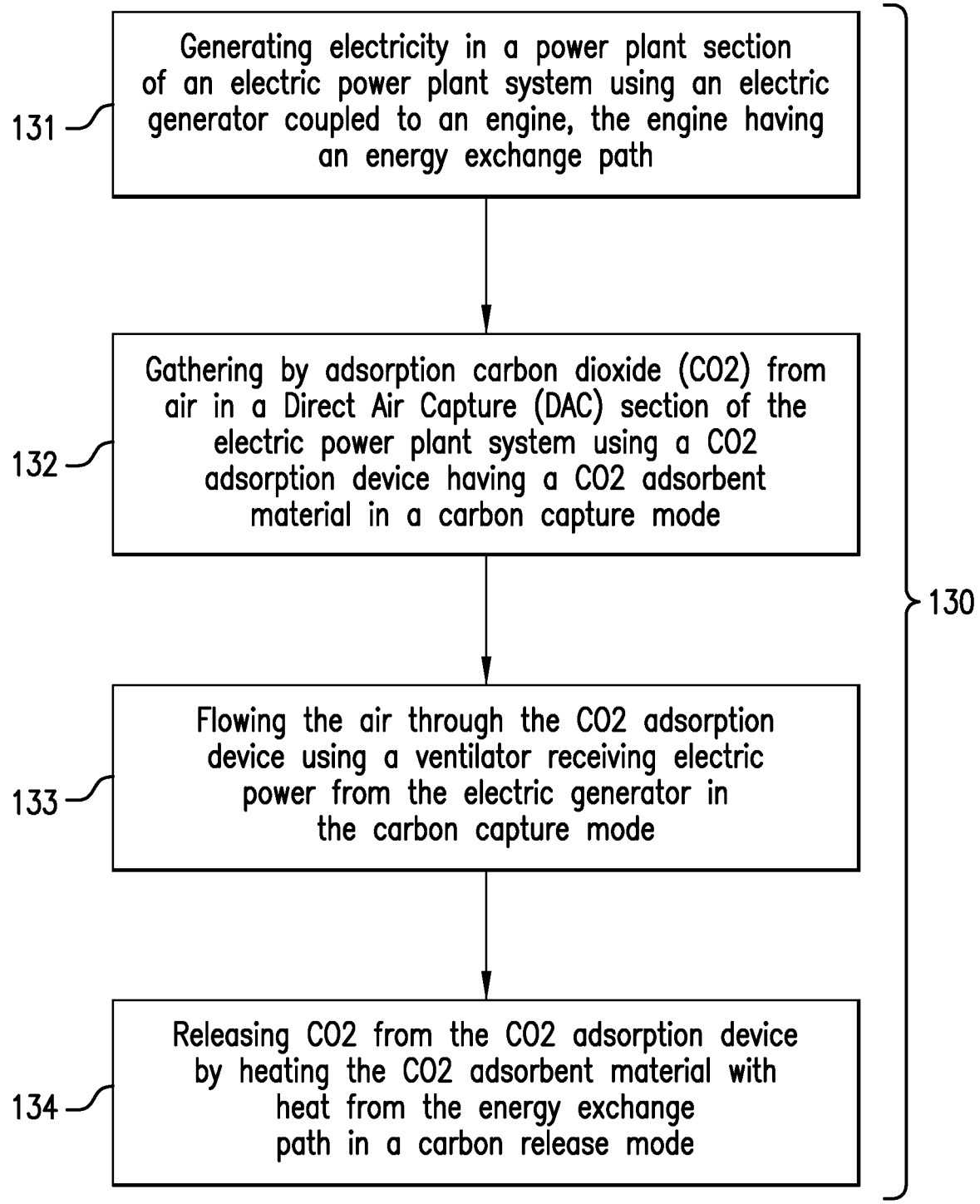
FIG. 11 is a flowchart representation of a method for generating electricity with reduced or negative carbon emissions.

FIG. 11 is a flow chart for a method 130 for generating electricity with reduced or negative carbon emissions. Block 131 calls for generating the electricity in a power plant section of an electric power plant system using an electricity generating unit being coupled to a hydrocarbon fuel supply and having an electrical output and an energy exchange path. In one or more embodiments, the energy exchange path operates as an energy discharge path. In non-limiting embodiments, the electricity generating unit operates in a supercritical $CO_2$ power cycle, as a gas turbine, as a reciprocating engine, or as a fuel cell system having an energy discharge stream and a $CO_2$ discharge stream.

Block 132 calls for gathering by adsorption carbon dioxide ($CO_2$) from air in a Direct Air Capture (DAC) section of the electric power plant system using a $CO_2$ adsorption device having a $CO_2$ adsorbent material in a carbon capture mode.

Block 133 calls for flowing the air through the $CO_2$ adsorption device using a ventilator receiving electric power from the electricity generating unit in the carbon capture mode.

Block 134 calls for releasing $CO_2$ from the $CO_2$ adsorption device by providing energy to the $CO_2$ adsorbent material with energy from the energy exchange path in a carbon release mode.

In embodiments where the electricity generating unit operates in a supercritical $CO_2$ power cycle, the method 130 may also include: (1) combusting a hydrocarbon fuel using a combustor disposed in the supercritical $CO_2$ power cycle; (2) converting energy released by the combusting to mechanical output energy using an expander disposed in the supercritical $CO_2$ power cycle and coupled to an output of the combustor; (3) providing oxidant to the combustor using an air separation unit (ASU) coupled to an input the combustor; and (4) extracting water from working fluid flow after expansion in the expander using a water separation unit coupled to an output of the expander; wherein the electric generator is coupled to a mechanical output of the expander; and wherein the energy exchange path is a working fluid discharge path of the expander.

The method 130 may also include using an energy exchanger coupled to a working fluid discharge path of the expander for supplying energy indirectly in a form of heat or directly in a form of $CO_2$ mass flow to the $CO_2$ adsorption device in the carbon release mode to release $CO_2$ from the $CO_2$ adsorbent material, wherein the $CO_2$ adsorbent material comprises metal-organic-framework (MOF).

The method 130 may also include introducing a $CO_2$ flow from the DAC section in the carbon release mode into the combustor by using a first $CO_2$ compressor disposed in the DAC section and receiving electric power from the electrical generator for compressing the $CO_2$ released from the $CO_2$ adsorption material in the carbon release mode.

The method 130 may also include compressing $CO_2$ discharged from the energy exchanger and from the output of the first $CO_2$ compressor using a second $CO_2$ compressor disposed in the power plant section, receiving electric power from the electric generator, and coupled to an output of the water separator and an output of the first $CO_2$ compressor, wherein a first portion of a discharge from the second $CO_2$ compressor is exported for the sequestration and a second portion of the discharge from the second $CO_2$ compressor is recycled into the combustor.

In embodiments where the electricity generating unit includes a gas turbine, reciprocating engine, or fuel cell system each having an energy exhaust, the method 130 may include: (1) capturing $CO_2$ from the energy exhaust using a $CO_2$ capture unit coupled to the energy exhaust path; and (2) compressing the $CO_2$ captured by the $CO_2$ capture unit for exporting the compressed $CO_2$ using a $CO_2$ compressor coupled to an outlet of the $CO_2$ capture unit, the $CO_2$ compressor receiving electric power from the electricity generating unit. The $CO_2$ capture unit may implement a Chilled Ammonia Process (CAP) or a Compact Carbon Capture with rotating bed (3C). The $CO_2$ adsorbent material may include a metal-organic-framework (MOF). The method 130 may also include: (3) recovering heat from the energy exhaust path for generating steam using a heat recovery steam generator (HRSG) disposed in the power plant section in the energy exhaust path between the engine and the $CO_2$ capture unit; and (4) generating the electricity using a steam turbine coupled to an electric generator, the steam turbine receiving steam from the HRSG. The method 130 may further include: (5) compressing the $CO_2$ captured by the $CO_2$ capture unit using a first $CO_2$ compressor coupled to an outlet of the $CO_2$ capture unit, the first $CO_2$ compressor receiving electric power from the electricity generating unit; extracting water from compressed $CO_2$ from the first $CO_2$ compressor using a water separator coupled to an output of the first $CO_2$ compressor to provide dry compressed $CO_2$; and (6) compressing the dry compressed $CO_2$ using a second $CO_2$ compressor coupled to an output of the water separator, the second $CO_2$ compressor receiving electric power from the electricity generating unit.

Figure 12:
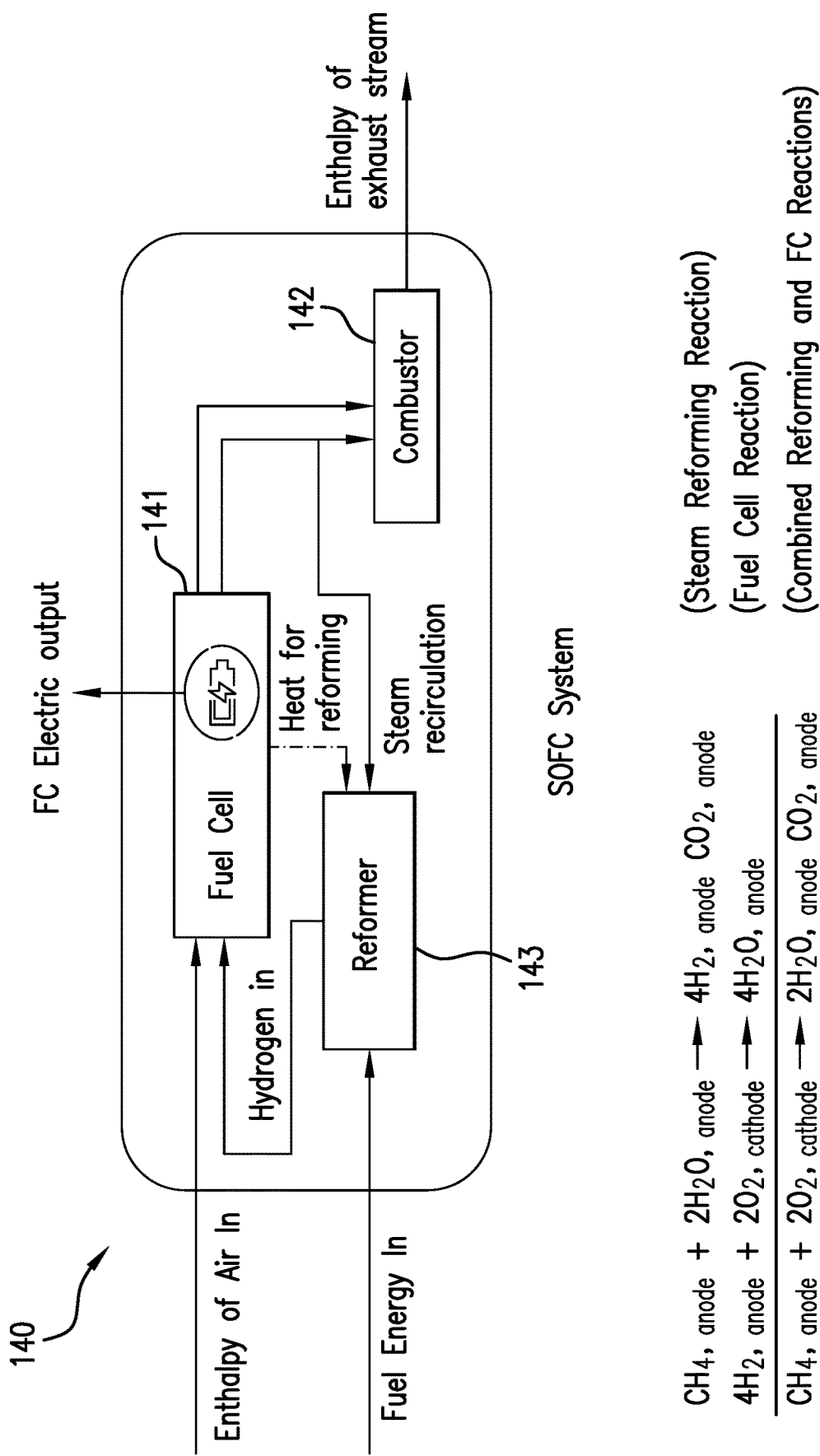
FIG. 12 depicts aspect of a solid-oxide-fuel-cell (SOFC) system.

As disclosed herein, the term "fuel cell" relates to a type of fuel cell or fuel cell system that produces a carbon dioxide stream and an energy discharge stream. One example of this type of fuel cell is a solid-oxide-fuel-cell (SOFC) system referred to as a SOFC 140 illustrated in FIG. 12. The SOFC 140 includes a fuel cell reactor 141 that produces an electrical output to supply electricity to the grid and the DAC section 12. Fluid outputs of the fuel cell reactor 141 are coupled to a combustor 142 and a reformer 143. Chemical reactions for the fuel cell reactor 141 and the reformer 143 are also illustrated in FIG. 12. The combustor 142 combusts unutilized hydrocarbon fuel from the fuel cell reactor 141. Output from the combustor 142 provides the energy discharge stream or energy exchange path. The reformer 143 performs a steam reforming reaction using heat and steam from the fuel cell reactor 141 to reform a hydrocarbon fuel to provide hydrogen to the fuel cell reactor 141 where the hydrogen is oxidized at an electrode to produce electricity.

Figure 13:
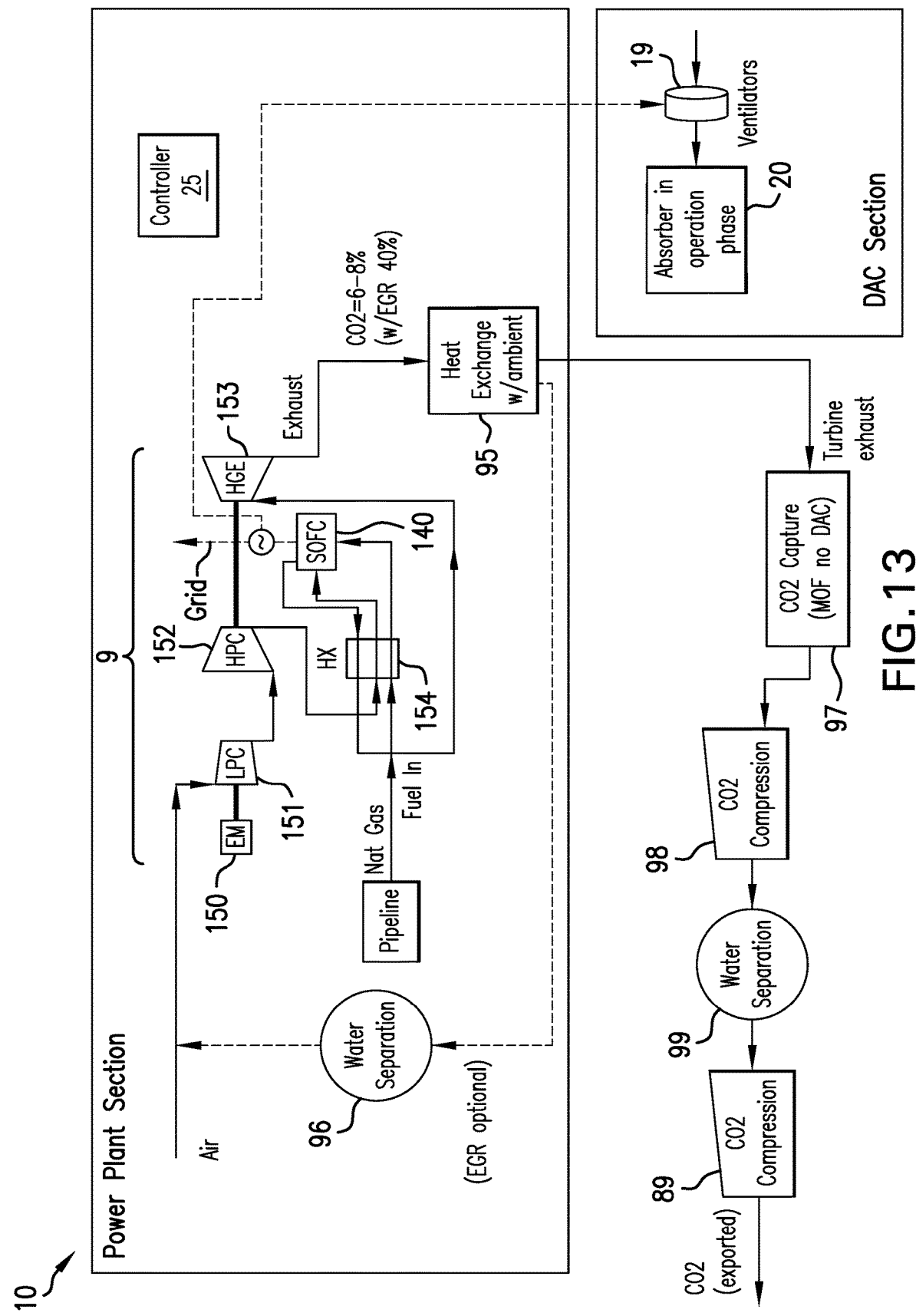
FIG. 13 depicts aspects of the SOFC system with enhancements in the carbon capture mode.

FIG. 13 illustrates a simplified diagram of the electric power plant system 10 having the power plant section 11 coupled to the DAC section 12 operating in a carbon capture mode with the electricity generating unit 9 being the SOFC 140 integrated with enhancements that include an expander. In this embodiment, the electricity generating unit 9 includes the SOFC system 140, an electric motor (EM) 150, a low pressure (LP) air compressor 151, a high pressure (HP) compressor 152, an expander 153, and a multi-stream heat exchanger (HX) 154. The EM 150 is coupled to the LP compressor 151 for driving the LP compressor 151 and receives electric power from the SOFC system 140. During start-up a local battery may be used to temporarily power the EM 150 until the fuel cell reactor begins to generate the electricity. Compressed air from the LP compressor 151 is provided to an input of the HP compressor 152. The terms LP and HP may be considered as relative terms such that the pressure output of the HP compressor 152 is higher than the pressure output of the LP compressor 151. The expander 153 is coupled to the HP compressor 152 for driving the HP compressor 152. The multi-stream heat exchanger (HX) 154 has a primary side and at least two secondary sides heated by the primary side. A primary side input is coupled to a high pressure and high temperature exhaust stream of the SOFC system 140, while a primary side output is coupled to an input of the expander 153. Hence, the high pressure and high temperature exhaust stream of the SOFC system 140 powers the expander 153 and thus the HP compressor 152. One secondary side of the HX 154 is coupled to a hydrocarbon fuel input to the SOFC system 140 for heating the hydrocarbon fuel to the SOFC 140. Another secondary side of the HX 154 is coupled to a HP output of the HP compressor 152 for heating an oxidant supply to the SOFC system 140.

The SOFC system 140 integrated with the above components are configured to produce electric power that is provided to the grid, to the EM 150, and to the DAC components. The SOFC system 140 produces electrical power when a fuel and oxidant undergo an electrochemical reaction inside the SOFC 140 under certain defined conditions. The expander produces mechanical power by converting work of high pressure and temperature exhaust gas of the SOFC system 140 that is expanded to low temperature and low pressure. The LP and HP compressors 151 and 152 are configured to deliver high pressure oxidant (e.g., air) to the SOFC system 140. The SOFC system 140 is configured to receive compatible hydrocarbon fuels such as natural gas for example. The heat exchanger 154 is external to the SOFC system 140 and is configured to allow heat exchange between 3 streams—(1) a fuel stream of a SOFC fuel feed line, upstream the SOFC 140, (2) the exhaust gas from the SOFC 140, downstream of SOFC 140, and (3) a high-pressure oxidant feed line to the SOFC 140, upstream of SOFC 140.

The electrical power is generated by the pressurized fuel cell reactor 141 performing an electrochemical reaction between pre-heated fuel and oxidant streams coming from the multi-stream heat exchanger 154. A combustion chamber of the combustor 142 is an integral part of SOFC 140, that helps in burning unutilized fuel from the pressurized fuel cell reactor 141 by use of oxidant, producing high temperature exhaust gases. The hot exhaust gases from the fuel cell reactor 141 exchange heat with fuel and oxidant streams in the multi-stream heat exchanger 154. The expander 153 is arranged down stream of heat exchanger 154 and is driven by hot exhaust gases of SOFC system 140. The expander 153 and HP compressor 152 are connected to each other through a common shaft in one or more embodiments. The power produced by the expander 153 is used to drive the HP compressor 152 and excess power may be extracted through a generator (not shown) connected to the other side of the shaft of the expander 153.

The power producing unit, the solid oxide fuel cell system 140 integrated with the expander 153 operates as follows. Air to the SOFC system 140 is compressed through a two-stage compression system. An air stream is drawn from atmosphere by the low-pressure compressor 151, which is driven by the small electrical motor 150, is compressed to a first stage of pressure. The air from the first stage of compression is fed to the high-pressure compressor 152, which is driven by the gas expander 153, and the air is further compressed to high pressure. A compressed air stream from the HP compressor 152 is passed through the heat exchanger 154 before being introduced in to SOFC system 140. The heat exchanger 154 also heats a fuel stream, the source of power, from an outside source. The heated stream of air and the heated stream of fuel from the heat exchanger are injected in to the SOFC system 140. Inside the fuel cell reactor 141, the heated air and the heated fuel undergo an electro-chemical reaction at the electrodes of the fuel cell reactor 141 to produce electrical power. The exhaust gases, unutilized fuel and air are mixed in the integral combustor 142 of the SOFC 140 and combusted in the combustion chamber. This energy of combustion further increases the temperature of the exhaust gas stream from the combustor 142. The high temperature exhaust gas stream is then fed to the heat exchanger 154 to exchange heat with incoming streams of fuel and air. From the heat exchanger 154, the high pressure and high temperature exhaust gas stream is fed to the expander 153. The high pressure and high temperature exhaust gas stream undergoes expansion in the expander 153 converting its energy to work and further optionally to electrical power. The expander 153 transmits part power to HP compressor 152 and optionally remaining power to a generator through connected common shaft.

Figure 14:
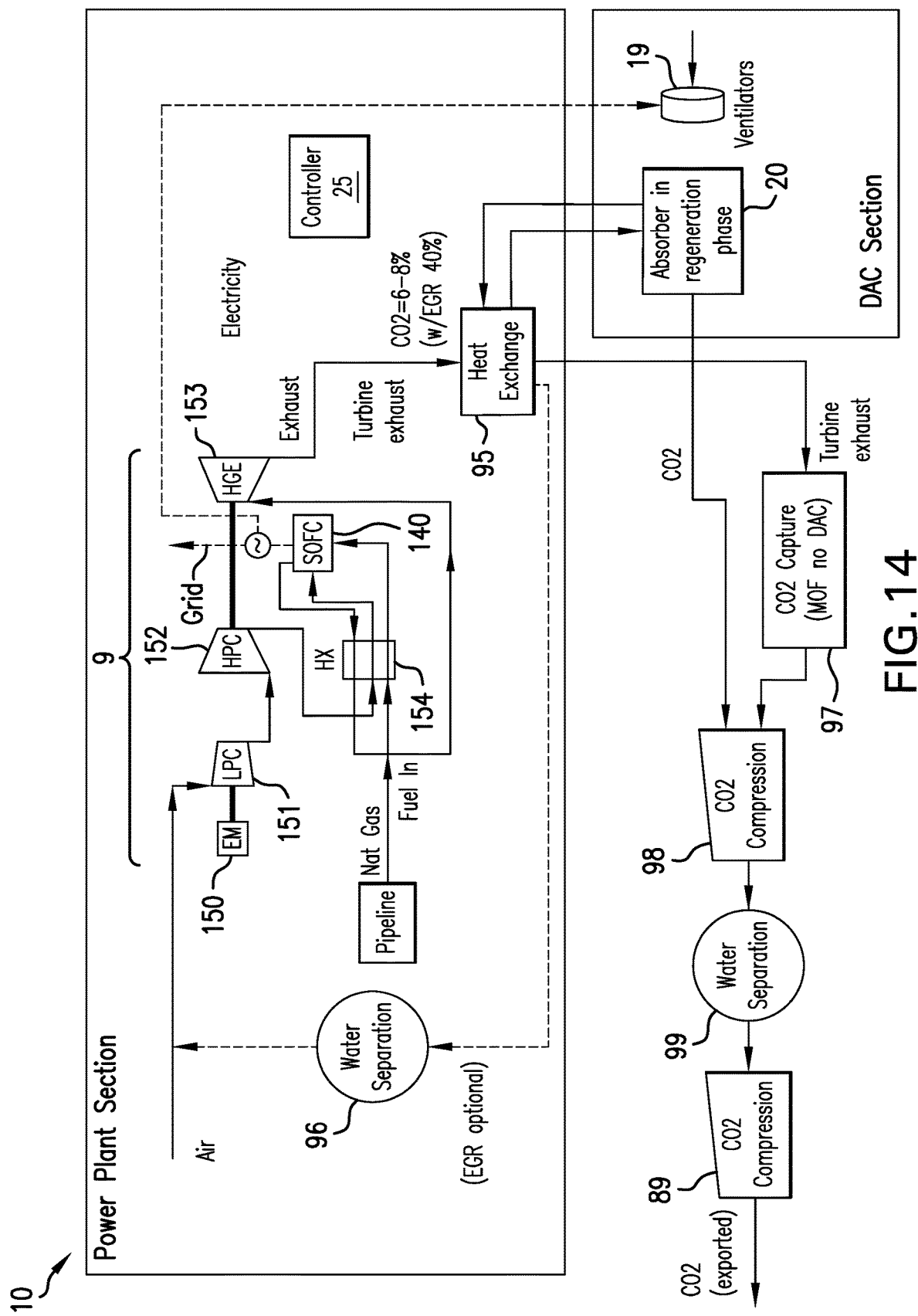
FIG. 14 depicts aspects of the SOFC system with enhancements in the carbon release mode.

FIG. 14 illustrates a simplified diagram of the electric power plant system 10 having the power plant section 11 coupled to the DAC section 12 operating in a carbon release mode with the electricity generating unit 9 being the SOFC system 140 integrated with the expander 153. In the carbon release mode, energy (i.e., heat) is directed from the heat exchanger 95 to the $CO_2$ adsorption device 20 to heat the $CO_2$ adsorption device 20. The $CO_2$ released from the $CO_2$ adsorption device 20 is directed to the first captured $CO_2$ compressor 98 for further processing prior to being exported for sequestration.

Figure 15:
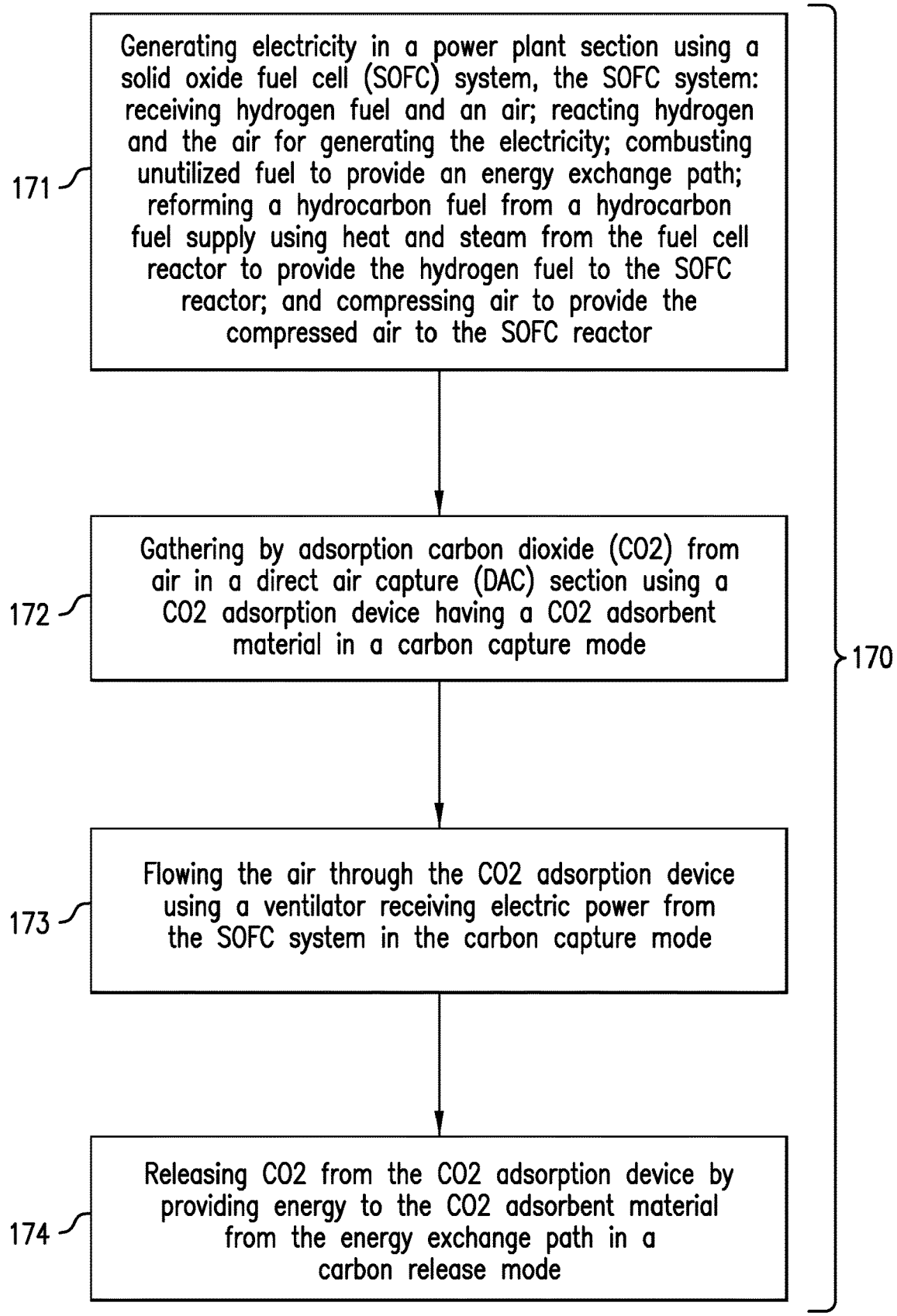
FIG. 15 is a flowchart representation of a method for generating electricity with reduced or negative carbon emissions using a fuel cell system.

FIG. 15 is a flow chart for a method 170 for generating electricity with reduced or negative carbon emissions using a fuel cell system. Block 171 calls for generating the electricity in a power plant section using a solid oxide fuel cell (SOFC) system, the SOFC system: receiving hydrogen fuel and an air; reacting hydrogen and the air for generating the electricity; combusting unutilized fuel to provide an energy exchange path; reforming a hydrocarbon fuel from a hydrocarbon fuel supply using heat and steam from the fuel cell reactor to provide the hydrogen fuel to the SOFC reactor; and compressing air to provide the compressed air to the SOFC reactor. In one or more embodiments, the energy exchange path operates as an energy discharge path.

Block 172 calls for gathering by adsorption carbon dioxide ($CO_2$) from air in a direct air capture (DAC) section using a $CO_2$ adsorption device having a $CO_2$ adsorbent material in a carbon capture mode.

Block 173 calls for flowing the air through the $CO_2$ adsorption device using a ventilator receiving electric power from the SOFC system in the carbon capture mode.

Block 174 calls for releasing $CO_2$ from the $CO_2$ adsorption device by providing energy to the $CO_2$ adsorbent material from the energy exchange path in a carbon release mode. The releasing may include at least one of heating the $CO_2$ adsorbent material using mass flow of a fluid in the energy exchange path or heating the $CO_2$ adsorbent material using a heat transfer fluid heated by a heat exchanger in a secondary side, a primary side of the heat exchanger being heated by energy from the energy exchange path.

The method 170 may also include capturing $CO_2$ using a $CO_2$ capture device receiving an exhaust from the combustor.

The method 170 may also include: compressing $CO_2$ released by the $CO_2$ adsorbent material and the $CO_2$ capture device to provide compressed $CO_2$; separating water from the compressed to provide dry compressed $CO_2$; compressing the dry compressed $CO_2$ to provide further compressed dry $CO_2$; and exporting the further compressed dry $CO_2$.

The method 170 may also include: driving a high-pressure compressor providing the compressed air to the SOFC reactor using an expander coupled to the high-pressure compressor and driven by exhaust from the combustor; and reforming the hydrocarbon fuel using energy from the SOFC reactor.

The method 170 may also include providing low-pressure compressed air to the high-pressure compressor using a low-pressure compressor; and driving the low-pressure compressor using an electric motor coupled to the low-pressure compressor.

The method 170 may also include: drying exhaust from the expander to provide dried exhaust; and recycling the dried exhaust into the low-pressure compressor.

In support of the teachings herein, various analysis components may be used, including a digital and/or an analog system. For example, the controller 25 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Batteries to supply electric power for start-up or shutdown purposes may be disposed in various locations throughout the electric power plant system 10. The batteries may be charged using electricity generated in the power plant section 11.

Set forth below are some embodiments of the foregoing disclosure:

Embodiment 1. A system for generating electricity with reduced or negative carbon emissions, including a power plant section comprising an electricity generating unit having an input coupled to a hydrocarbon fuel supply and an energy exchange path, a direct air capture (DAC) section comprising a $CO_2$ adsorption device having a $CO_2$ adsorbent material and a ventilator electrically coupled to the electricity generating unit, the ventilator directing air flow through the $CO_2$ adsorption device in a carbon capture mode, wherein the $CO_2$ adsorption device is coupled to and in energy communication with the energy exchange path for releasing adsorbed $CO_2$ in a carbon release mode.

Embodiment 2. The system as in any prior embodiment, further including a $CO_2$ compressor coupled to a $CO_2$ release port of the $CO_2$ adsorption device for compressing a portion of the adsorbed $CO_2$ in a carbon release mode and providing the portion for export, and a carbon export heat exchanger having a primary side coupled to an output of the $CO_2$ compressor and a secondary side coupled to the $CO_2$ adsorption device for heating the $CO_2$ adsorbent material in the carbon release mode.

Embodiment 3. The system as in any prior embodiment, wherein the electricity generating unit comprises components of a supercritical $CO_2$ power cycle, a gas turbine, a reciprocating engine, or a fuel cell system producing a $CO_2$ stream and an energy discharge stream.

Embodiment 4. The system as in any prior embodiment, wherein the components of the supercritical $CO_2$ power cycle comprise a combustor disposed in the thermodynamic power cycle to combust a hydrocarbon fuel, an air separation unit (ASU) coupled to an input the combustor for providing oxidant to the combustor, an expander coupled to an output of the combustor for converting energy released by the combusting to mechanical output energy and comprising a working fluid discharge path as the energy exchange path, an electric generator coupled to the expander to receive the mechanical output energy from the expander, and a water separation unit coupled to the working fluid discharge path of the expander to extract water from working fluid flow after expansion of the working fluid in the expander.

Embodiment 5. The system as in any prior embodiment, wherein the components further comprise an energy exchanger coupled to the working fluid discharge path of the expander to supply energy indirectly in a form of heat from a heat exchanger or directly in a form $CO_2$ mass flow to the $CO_2$ absorption device in the carbon release mode to release $CO_2$ from the $CO_2$ absorbent material.

Embodiment 6. The system as in any prior embodiment, further including a first $CO_2$ compressor disposed in the DAC section, electrically coupled to the electric generator, having an input in fluid communication with the $CO_2$ released from the $CO_2$ adsorbent material in the carbon release mode to compress the released $CO_2$ to provide compressed $CO_2$, and having an output coupled to the supercritical $CO_2$ power cycle to introduce the compressed $CO_2$ into the supercritical $CO_2$ power cycle.

Embodiment 7. The system as in any prior embodiment, further including a second $CO_2$ compressor disposed in the power plant section, electrically coupled to the electric generator, having an input coupled to an output of the water separator and an output of the first $CO_2$ compressor to compress $CO_2$ discharged from the energy exchanger and from the first $CO_2$ compressor, and having an output coupled to a carbon sequestration process and to the supercritical $CO_2$ power cycle to recycle a portion of the $CO_2$.

Embodiment 8. The system as in any prior embodiment, wherein the $CO_2$ adsorbent material comprises a metal-organic-framework (MOF).

Embodiment 9. The system as in any prior embodiment, wherein the electricity generating unit comprises the gas turbine, the reciprocating engine, or the fuel cell system, each having a combustion exhaust path as the energy exchange path, the system further including a $CO_2$ capture unit coupled to the combustion exhaust path for capturing $CO_2$ from the combustion exhaust path, and a $CO_2$ compressor and coupled to an outlet of the $CO_2$ capture unit for compressing the $CO_2$ captured by the $CO_2$ capture unit.

Embodiment 10. The system as in any prior embodiment wherein the $CO_2$ capture unit comprises a chilled ammonia process (CAP) or a compact carbon capture with rotating bed (3C) and the $CO_2$ adsorbent material comprises a metal-organic-framework (MOF).

Embodiment 11. The system as in any prior embodiment, further including components of a heat recovery power cycle, the components including a heat recovery steam generator (HRSG) disposed in the power plant section in the combustion exhaust path downstream of an exhaust port of the electricity generating unit and upstream of the $CO_2$ capture unit, the HRSG generating steam from heat of the engine exhaust path, a steam turbine coupled to the HRSG for receiving the generated steam and having a mechanical output coupled to the electric generator or another electric generator for generating the electricity, and an energy recovery energy exchanger disposed in the heat recovery power cycle downstream of the steam turbine and in energy communication with the $CO_2$ adsorption device during the carbon release mode.

Embodiment 12. The system as in any prior embodiment, wherein the fuel cell system includes a fuel cell reactor that performs an electro-chemical reaction of hydrogen and air to generate the electricity, the fuel cell reactor having an input that receives the hydrogen and air, an exhaust output that discharges unutilized hydrogen, a steam exhaust output that discharges steam, and a heat exhaust output that discharges energy, a combustor coupled to the exhaust output and the steam exhaust output, the combustor combusting the unutilized hydrogen, a combustion exhaust path of the combustor being the energy exchange path, and a reformer coupled to the heat exhaust output and the steam exhaust output of the fuel cell reactor, the reformer using the energy and the steam to reform a hydrocarbon fuel to provide the hydrogen.

Embodiment 13. A method for generating electricity with reduced or negative carbon emissions, the method including generating the electricity in a power plant section of an electric power plant system using an electricity generating unit being coupled to a hydrocarbon fuel supply and having an electrical output and an energy exchange path, gathering by adsorption carbon dioxide ($CO_2$) from air in a Direct Air Capture (DAC) section of the electric power plant system using a $CO_2$ adsorption device having a $CO_2$ adsorbent material in a carbon capture mode, flowing the air through the $CO_2$ adsorption device using a ventilator receiving electric power from the electricity generating unit in the carbon capture mode, and releasing $CO_2$ from the $CO_2$ adsorption device by providing energy to the $CO_2$ adsorbent material with energy from the energy exchange path in a carbon release mode.

Embodiment 14. The method as in any prior embodiment, further including compressing the $CO_2$ released from the $CO_2$ adsorption device using a $CO_2$ compressor to provide compressed $CO_2$ for export, extracting heat from the $CO_2$ for export using a carbon export heat exchanger coupled to the $CO_2$ compressor to provide extracted heat, and heating the $CO_2$ adsorbent material with the extracted heat to release $CO_2$ from the $CO_2$ adsorption device in the carbon release mode.

Embodiment 15. The method as in any prior embodiment, wherein the electricity generating unit operates in a supercritical $CO_2$ power cycle, as a gas turbine, as a reciprocating engine, or a fuel cell system producing a carbon dioxide stream and an energy discharge stream.

Embodiment 16. The method as in any prior embodiment, wherein the electricity generating unit operates in the supercritical $CO_2$ power cycle and the method further includes combusting a hydrocarbon fuel using a combustor disposed in the supercritical $CO_2$ power cycle, converting energy released by the combusting to mechanical output energy using an expander disposed in the supercritical $CO_2$ power cycle and having an input coupled to an output of the combustor, the expander being coupled to an electric generator for generating the electricity, providing oxidant to the combustor using an air separation unit (ASU) coupled to an input the combustor, extracting water from working fluid flow after expansion in the expander using a water separation unit coupled to an output of the expander, wherein the energy exchange path is a working fluid discharge path of the expander.

Embodiment 17. The method as in any prior embodiment, further including using an energy exchanger coupled to the working fluid discharge path of the expander for supplying energy indirectly in a form of heat or directly in a form of $CO_2$ mass flow to the $CO_2$ adsorption device in the carbon release mode to release $CO_2$ from the $CO_2$ adsorbent material, wherein the $CO_2$ adsorbent material comprises metal-organic-framework (MOF).

Embodiment 18. The method as in any prior embodiment, further including introducing a $CO_2$ flow from the DAC section in the carbon release mode into the combustor by using a first $CO_2$ compressor disposed in the DAC section and receiving electrical power from the electric generator for compressing the $CO_2$ released from the $CO_2$ adsorption material in the carbon release mode.

Embodiment 19. The method as in any prior embodiment, further including compressing $CO_2$ discharged from the energy exchanger and from the output of the first $CO_2$ compressor using a second $CO_2$ compressor disposed in the power plant section, receiving electric power from the electric generator, and coupled to an output of the water separator and an output of the first $CO_2$ compressor, wherein a first portion of a discharge from the second $CO_2$ compressor is exported for the sequestration and a second portion of the discharge from the second $CO_2$ compressor is recycled into the combustor.

Embodiment 20. The method as in any prior embodiment, wherein the electricity generating unit operates as the gas turbine, the reciprocating engine, or the fuel cell system, each having a combustion exhaust path as the energy exchange path, the method further including capturing $CO_2$ from the combustion exhaust path using a $CO_2$ capture unit coupled to the combustion exhaust path, and compressing the $CO_2$ captured by the $CO_2$ capture unit for exporting the compressed $CO_2$ using a $CO_2$ compressor coupled to an outlet of the $CO_2$ capture unit, the $CO_2$ compressor receiving electric power from the electric generating unit.

Embodiment 21. The method as in any prior embodiment, wherein the $CO_2$ capture unit comprises a Chilled Ammonia Process (CAP) or a Compact Carbon Capture with rotating bed (3C), and the $CO_2$ adsorbent material includes a metal-organic-framework (MOF).

Embodiment 22. The method as in any prior embodiment, further including recovering energy from the combustion exhaust path for generating steam using a heat recovery steam generator (HRSG) disposed in the power plant section in the combustion exhaust path between the electricity generating unit and the $CO_2$ capture unit, and generating the electricity using a steam turbine coupled to the electric generator or another electric generator, the steam turbine receiving steam from the HRSG.

Embodiment 23. The method as in any prior embodiment, wherein the compressing the $CO_2$ captured by the $CO_2$ capture unit includes compressing the $CO_2$ captured by the $CO_2$ capture unit using a first $CO_2$ compressor coupled to an outlet of the $CO_2$ capture unit, the first $CO_2$ compressor receiving electric power from the electricity generating unit, extracting water from compressed $CO_2$ from the first $CO_2$ compressor using a water separator coupled to an output of the first $CO_2$ compressor to provide dry compressed $CO_2$, and compressing the dry compressed $CO_2$ using a second $CO_2$ compressor coupled to an output of the water separator, the second compressor receiving electric power from the electricity generating unit.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured. The term "coupled" relates to being coupled directly or indirectly using an intermediate device. The terms "first" and "second" and the like are used to distinguish terms and not to denote a particular order.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A system for generating electricity provided to an electric grid with reduced or negative carbon emissions, the system comprising:
    a power plant section comprising an electricity generating unit comprising an energy exchange path, wherein the electricity generating unit comprises:
        a working fluid comprising carbon dioxide ($CO_2$);
        a combustor coupled to a supply of hydrocarbon fuel and a supply of pure oxygen and configured to combust the hydrocarbon fuel with the pure oxygen to heat the $CO_2$ to a supercritical state and to produce additional $CO_2$;
        an expander coupled to an output of the combustor to receive the $CO_2$ in the supercritical state and configured to convert energy of the $CO_2$ in the supercritical state to mechanical output energy, the expander comprising a working fluid discharge path as the as the energy exchange path;
        an electric generator coupled to the expander and configured to receive the mechanical output energy for generating the electricity, the electric generator comprising an output coupled to the electric grid;
        an energy exchanger comprising an input coupled to the expander and configured to receive $CO_2$ discharged from the expander;
        a compressor comprising an input coupled to an output of the energy exchanger and an output coupled to an input of the combustor to compress and recycle at least a portion of the $CO_2$ discharged by the expander;
    a direct air capture (DAC) section comprising a $CO_2$ adsorption device having a $CO_2$ adsorbent material and a ventilator electrically coupled to the electric generator, the ventilator directing air flow through the $CO_2$ adsorption device in a carbon capture mode;
    wherein the $CO_2$ adsorption device is coupled to and in energy communication with the energy exchange path for releasing adsorbed $CO_2$ in a carbon release mode further comprising a water separator disposed in a line between the energy exchanger and the compressor and configured to separate water from a discharge of the energy exchanger; further comprising another compressor disposed in a line between the $CO_2$ adsorption device and at least one of an input of the water separator or a line leading to an input of the water separator, the another compressor comprising an input coupled to an output of the $CO_2$ adsorption device configured to discharge $CO_2$ in the carbon release mode.

2. The system according to claim 1, further comprising:
    a $CO_2$ compressor coupled to a $CO_2$ release port of the $CO_2$ adsorption device for compressing a portion of the adsorbed $CO_2$ in a carbon release mode and providing the portion for export; and
    a carbon export heat exchanger having a primary side coupled to an output of the $CO_2$ compressor and a secondary side coupled to the $CO_2$ adsorption device for heating the $CO_2$ adsorbent material in the carbon release mode.

3. The system according to claim 1, wherein the $CO_2$ adsorbent material comprises a metal-organic-framework (MOF).

4. The system according to claim 1, wherein the $CO_2$ adsorption device is coupled to the working fluid discharge path of the expander such that the $CO_2$ adsorbent material is heated in the carbon release mode by $CO_2$ discharged from the expander.

5. The system according to claim 1, further comprising a heat exchanger having a first side coupled to the working fluid discharge path of the expander and a second side coupled to the $CO_2$ adsorption device such that the $CO_2$ adsorbent material is heated in the carbon release mode by a heat transfer fluid heated in the heat exchanger by $CO_2$ discharged from the expander.

6. A method for generating electricity provided to an electric grid with reduced or negative carbon emissions, the method comprising:
    using carbon dioxide ($CO_2$) as a working fluid in an electricity generating unit of a power plant section of an electric power plant system;
    combusting hydrogen fuel and pure oxygen in a combustor coupled to a supply of hydrocarbon fuel and a supply of pure oxygen to heat the $CO_2$ to a supercritical state and to produce additional $CO_2$;

converting energy of the $CO_2$ in the supercritical state to mechanical output energy using an expander coupled to an output the combustor;

generating the electricity using an electric generator coupled to the expander to receive the mechanical output energy and to provide the electricity to the electric grid;

using a working fluid discharge path of the expander as an energy exchange path;

receiving $CO_2$ discharged from the expander using an energy exchanger comprising an input coupled to the expander to receive $CO_2$ discharged from the expander;

compressing and recycling at least a portion of the $CO_2$ discharged by the expander to the combustor using a compressor comprising an input coupled to an output of the energy exchanger and an output coupled to an input of the combustor;

gathering by adsorption carbon dioxide ($CO_2$) from air in a Direct Air Capture (DAC) section of the electric power plant system using a $CO_2$ adsorption device having a $CO_2$ adsorbent material in a carbon capture mode;

flowing the air through the $CO_2$ adsorption device using a ventilator receiving electric power from the electric generator in the carbon capture mode; and releasing $CO_2$ from the $CO_2$ adsorption device by providing energy to the $CO_2$ adsorbent material with energy from the energy exchange path in a carbon release mode further comprising separating water from a discharge comprising $CO_2$ and water from the energy exchanger using a water separator having an output coupled to the input of the compressor; further comprising compressing $CO_2$ output from the $CO_2$ adsorption device in the carbon release mode using another compressor and providing compressed $CO_2$ from the another compressor to at least one of an input of the water separator or a line leading to an input of the water separator.

7. The method according to claim 6, further comprising:

compressing the $CO_2$ released from the $CO_2$ adsorption device using a $CO_2$ compressor to provide compressed $CO_2$ for export;

extracting heat from the $CO_2$ for export using a carbon export heat exchanger coupled to the $CO_2$ compressor to provide extracted heat; and heating the $CO_2$ adsorbent material with the extracted heat to release $CO_2$ from the $CO_2$ adsorption device in the carbon release mode.

8. The method according to claim 6, wherein releasing $CO_2$ from the $CO_2$ adsorption device by providing energy to the $CO_2$ adsorbent material with energy from the energy exchange path in a carbon release mode comprises heating the $CO_2$ adsorbent material with $CO_2$ discharged from the expander.

9. The method according to claim 6, wherein releasing $CO_2$ from the $CO_2$ adsorption device by providing energy to the $CO_2$ adsorbent material with energy from the energy exchange path in a carbon release mode comprises heating the $CO_2$ adsorbent material with a heat transfer fluid heated in a second side of a heat exchanger that receives $CO_2$ discharged from the expander in a first side of the heat exchanger.

* * * * *